United States Patent
Walters et al.

(10) Patent No.: US 12,182,267 B2
(45) Date of Patent: *Dec. 31, 2024

(54) SYSTEMS, METHODS AND DEVICES FOR MEMORY ANALYSIS AND VISUALIZATION

(71) Applicant: Volexity, Inc., Reston, VA (US)

(72) Inventors: Aaron Walters, Reston, VA (US); Michael Ligh, Reston, VA (US); Steven Adair, Reston, VA (US)

(73) Assignee: Volexity, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,833

(22) Filed: Jul. 6, 2023

(65) Prior Publication Data
US 2024/0037235 A1 Feb. 1, 2024

Related U.S. Application Data

(63) Continuation of application No. 17/374,575, filed on Jul. 13, 2021, now Pat. No. 11,734,427, which is a continuation of application No. 15/754,966, filed as application No. PCT/US2016/047564 on Aug. 18, 2016, now Pat. No. 11,093,613.

(60) Provisional application No. 62/209,456, filed on Aug. 25, 2015.

(51) Int. Cl.
| G06F 11/00 | (2006.01) |
| G06F 12/14 | (2006.01) |
| G06F 12/16 | (2006.01) |
| G06F 21/52 | (2013.01) |
| G06F 21/53 | (2013.01) |
| G06F 21/54 | (2013.01) |
| G06F 21/56 | (2013.01) |
| G06F 21/57 | (2013.01) |
| G08B 23/00 | (2006.01) |
| H04L 9/40 | (2022.01) |

(52) U.S. Cl.
CPC ............ *G06F 21/566* (2013.01); *G06F 21/52* (2013.01); *G06F 21/53* (2013.01); *G06F 21/54* (2013.01); *G06F 21/577* (2013.01); *H04L 63/1425* (2013.01); *H04L 63/1433* (2013.01); *H04L 63/145* (2013.01)

(58) Field of Classification Search
CPC .............................. G06F 21/54; G06F 21/566
USPC .......................................................... 726/23
See application file for complete search history.

(56) References Cited

U.S. PATENT DOCUMENTS

| 6,803,930 B1 | 10/2004 | Simonson |
| 9,940,459 B1 | 4/2018 | Saxe |
| 2007/0044152 A1 | 2/2007 | Newman et al. |
| 2009/0290492 A1* | 11/2009 | Wood .................... H04L 67/568 370/235 |

(Continued)

OTHER PUBLICATIONS

International Search Report dated Sep. 26, 2016 for PCT/US2016/047564.

*Primary Examiner* — Brandon Hoffman
*Assistant Examiner* — Samuel Ambaye
(74) *Attorney, Agent, or Firm* — Jones Day

(57) ABSTRACT

Systems, methods, and processing devices for aiding with cyber intrusion investigations that includes capabilities for extracting data from a specified range of a volatile memory of a target processing device, reconstructing data structures and artifacts from the extracted data; and generating and presenting a visualization of the reconstructed data structures and the reconstructed artifacts.

18 Claims, 19 Drawing Sheets

(56) References Cited

U.S. PATENT DOCUMENTS

| | | | |
|---|---|---|---|
| 2010/0205674 A1* | 8/2010 | Zorn | G06F 21/552 |
| | | | 726/25 |
| 2010/0211754 A1 | 8/2010 | Crosby et al. | |
| 2011/0078550 A1* | 3/2011 | Nabutovsky | G06F 16/9566 |
| | | | 715/206 |
| 2011/0185424 A1 | 7/2011 | Sallam | |
| 2012/0030731 A1* | 2/2012 | Bhargava | H04L 63/10 |
| | | | 726/3 |
| 2012/0079596 A1* | 3/2012 | Thomas | H04L 63/1433 |
| | | | 726/24 |
| 2012/0158737 A1* | 6/2012 | Levy | H04L 43/18 |
| | | | 707/E17.014 |
| 2014/0201836 A1* | 7/2014 | Amsler | H04L 63/20 |
| | | | 726/23 |
| 2015/0074811 A1 | 3/2015 | Capalik | |
| 2015/0096025 A1* | 4/2015 | Ismael | G06F 21/566 |
| | | | 726/23 |
| 2015/0121450 A1 | 4/2015 | Wistron | |

* cited by examiner

| Home | Process | Services | User Profile | Settings | Network | Registry | Kernel | File System | Autorun | Timeline | Whitelist |

| Connections | DNS | Sockets |

Total: 30   Load All   ✖ Whitelisted   ✖ Show Abandoned

| Pid | Process | Protocol | State | Local IP | Local Port | Remote IP | Remote Port | Location |
|---|---|---|---|---|---|---|---|---|
| -1 | (abandoned) | TCP | | 160.217.253.129 | 0 | 67.99.80.76 | 11776 | |
| -1 | (abandoned) | TCP | | 160.217.253.129 | 0 | 67.99.80.76 | 11776 | |
| -1 | (abandoned) | TCP | | 97.0.110.0 | 11520 | 109.0.112.0 | 30976 | |
| -1 | (abandoned) | TCP | | 97.0.110.0 | 11520 | 109.0.112.0 | 30976 | |
| -1 | (abandoned) | TCP | | 3.0.61.2 | 26996 | 8.113.58.130 | 22369 | |
| -1 | (abandoned) | TCP | | 3.0.61.2 | 26996 | 8.113.58.130 | 22369 | |
| 684 | lsass.exe | TCP | | 172.16.150.20 | 1397 | 172.16.150.10 | 1025 (blackjack) | |
| 684 | lsass.exe | TCP | | 172.16.150.20 | 1397 | 172.16.150.10 | 1025 (blackjack) | |
| 684 | lsass.exe | TCP | | 172.16.150.20 | 1397 | 172.16.150.10 | 1025 (blackjack) | |
| 684 | lsass.exe | TCP | | 172.16.150.20 | 1406 | 172.16.150.10 | 1025 (blackjack) | |
| 684 | lsass.exe | TCP | | 172.16.150.20 | 1396 | 172.16.150.10 | 135 (epmap) | |
| 684 | lsass.exe | TCP | | 172.16.150.20 | 1396 | 172.16.150.10 | 135 (epmap) | |
| 1796 | AdobeARM.exe | TCP | | 172.16.150.20 | 1427 | 199.7.52.190 | 80 (http) | |
| 1796 | AdobeARM.exe | TCP | | 172.16.150.20 | 1427 | 199.7.52.190 | 80 (http) | |
| 1796 | AdobeARM.exe | TCP | | 172.16.150.20 | 1428 | 199.7.59.190 | 80 (http) | |
| 1036 | explorer.exe | TCP | | 172.16.150.20 | 1424 | 221.54.197.32 | 443 (https) | |
| | (abandoned) | TCP | | 172.16.150.20 | 2132 | 173.194.76.108 | 993 (imaps) | |

SYSTEMS, METHODS AND DEVICES FOR MEMORY ANALYSIS AND VISUALIZATION

CROSS REFERENCE TO RELATED APPLICATIONS

This application is a continuation of U.S. application Ser. No. 15/754,966, filed Feb. 23, 2018, which is the National Phase application of International Application No. PCT/US2016/047564, filed Aug. 18, 2016, which designates the United States and was published in English, which claims the benefit of priority from U.S. Provisional Application No. 62/209,456, filed on Aug. 25, 2015. These applications, in their entirety, are incorporated herein by reference.

TECHNICAL FIELD

The present disclosure relates to systems, methods, and/or devices for memory analysis and/or visualization and more particularly, to systems, methods, and/or devices for detecting and analyzing one or more computer systems that may be suspected of, or exhibiting, indications of anomalous conditions and/or presenting graphical views of data stored in volatile memory.

BACKGROUND

Conventional computing machines (e.g., desktops, servers, mobile devices, networking equipment, virtual machines, smart devices, embedded devices, etc.) lack the necessary visibility into a state of the computing machine that may be required to determine if the computing machine remains in a trusted or compliant state. Traditional anti-virus technologies attempt to determine if a computing machine is experiencing abnormal conditions by looking for known signatures associated with malicious software artifacts within files found on the hard drive or within the data exposed by the operating system's application program interface (APIs). However, these conventional technologies do not have a mechanism for accessing and integrating critical data stored in a computing machine's runtime state, including the computing machine's volatile storage (e.g., device memory, random access memory (RAM), etc.). As a result, these computing machines are missing data that may be desirable for determining if something abnormal is happening on the computing machine or impacting the integrity of a network, e.g., an enterprise network.

Without access to this data, users do not possess a mechanism for effectively determining if malicious programs or individuals have compromised the underlying operating systems of their computing machines nor do they possess a mechanism for responding when such a compromise is suspected. Malicious entities typically exploit this lack of visibility by hiding or communicating through channels that are only found in volatile storage, such as shared memory. The growing requirements for automation, for performing analysis across an enterprise or fleet of machines, and/or for integrating information with other systems (e.g., intrusion detection systems, anti-virus, etc.) gives malicious entities further opportunities to exploit this lack of visibility. The ability to monitor the state of a computing machine becomes even more challenging because both the attackers and the model of normal for a system are not static and continue to evolve over time.

Accordingly, it may be desirable to have a system, device and/or method that is capable of addressing one or more of the shortcomings of conventional anti-virus and related systems. For example, it may be desirable to have a system, method, and/or device that is capable of addressing one or more of: (1) verifying that the state of a computing machine has not been maliciously and/or unintentionally modified; (2) providing a user with detailed information about some or all of the abnormal conditions that were found within the runtime state of the computing machine; and/or (3) highlighting artifacts that are not normally found on a particular type of computing machine or a computing machine within their environment.

SUMMARY

In some embodiments, the systems, methods, and/or devices described herein may be used for any combination of one or more of detecting intrusions, incident response, criminal investigations, malware analysis, and/or compliance or policy verification.

In some embodiments, processor-implemented systems, methods, and/or devices may be provided for detecting, analyzing, managing, and/or visualizing anomalous (e.g., malicious, unexpected, etc.) conditions on one or more computing machines. As an example, the systems, methods, and/or devices may include a graphical command console that manages remote software agents or distributed processing servers to evaluate and analyze the live runtime state of a computing machine directly or the runtime state information that may have been previously collected (e.g., memory samples, virtualizations snapshots, crash dumps, etc.).

Some embodiments may provide the ability to manage user investigation workflows (e.g., contraband, compliance, suspected users, compromise, etc.) as to what data will be collected from the runtime state information, the types of analysis algorithms used to detect anomalous conditions, and/or the ability to extract, index, and/or correlate the information about the state of the computing machine at a particular point in time or over periods of time. Some embodiments may enable the user to generate (e.g., automatically), manage, and/or share detections for anomalous conditions based on artifacts found within the runtime state information of a computing machine.

Some embodiments may also provide systems, methods, and/or devices that translate and reconstruct data structures found in physical memory of a computing machine into easily interpretable information. In some embodiments, this may include displaying the runtime state information and results to a user for manual review and analysis.

Some embodiments described herein may provide for a method, implemented by at least one processing device, for aiding cyber intrusion investigations that includes extracting data from a specified range of a volatile memory of a computing machine or a target processing device; reconstructing data structures and artifacts from the extracted data; and generating and presenting a visualization of the reconstructed data structures and the reconstructed artifacts, In some embodiments, the method may further include providing a plurality of analysis methods for evaluating a state of the target processing device, the plurality of analysis methods performing at least one of determining differences from a known good state, detecting indications of known attacker activity, detecting indications of malware being present, detecting heuristics associated with suspicious activity, detecting discrepancies in logical relationships among the reconstructed artifacts, and determining whether policies or standards have been violated.

In some embodiments, the plurality of analysis methods may include one or more of scripts, database queries, byte sequence signatures, string matching, and comparison of registry key values.

In some embodiments, the method may further include presenting indications of suspicious activity or indications of abnormal conditions to a user; and providing a facility for the user to bookmark and annotate artifacts.

In some embodiments, the method may further include providing a user an ability to develop custom workflows.

In some embodiments, the method may further include correlating information within the volatile memory with data stored in at least one other data source to determine an existence of at least one inconsistencies or anomalies.

In some embodiments, the method may further include extracting, indexing, and/or correlating information regarding a state of the target processing device over at least one particular point in time; and providing a facility for archiving and tracking changes in the state of the computing machine or target processing device over time.

In some embodiments, the method may further include providing a facility to generate a sharable analytics catalog.

In some embodiments, the method may further include providing a graphical user interface and a scriptable interface for formulating queries and performing other types of analysis.

In some embodiments, the method may further include generating, managing, and/or sharing detection methods for detecting anomalous conditions using artifacts displayed with the graphical user interface.

In some embodiments, the method may further include importing at least one other detection method for detecting the anomalous conditions using the artifacts displayed with the graphical user interface.

In some embodiments, the method may further include collecting metrics regarding effectiveness of the detection algorithms; and sending the collected metrics to at least one other computing machine or processing device for remote analytics.

In some embodiments, the method may further include automatically evaluating capabilities of memory resident executables and associated file formats by analyzing imported libraries and exported methods for inconsistencies or anomalies.

In some embodiments, the method may further include providing a facility to associate a response action with at least one analytic pattern.

In some embodiments, the response actions may include at least one of querying new types of data, modifying data, generating an alert, and/or halting a process.

In some embodiments, the method may further include importing or generating whitelists of normal, known, or trusted, conditions; sharing the whitelists; and managing the whitelists.

In some embodiments, the method may further include extracting metadata based on the extracted data; and storing the metadata, the metadata describing a system state and including a subset of original runtime state information.

In some embodiments, the method may further include providing a facility for distributing the stored metadata to a group of users.

In some embodiments, the method may further include reconstructing data stores based on data found in cached memory of the computing machine or processing device.

Some embodiments described herein may provide for a system for aiding cyber intrusion investigations, the system comprising: at least one processing device, the at least one processing device including: at least one processor, a memory having instructions stored therein for execution by the at least one processor, a storage device for storing data, and a communication bus connecting the at least one processor with the read only memory and the storage device. When the at least one processing device executes the instructions a method is performed comprising: providing a secure web services application program interface for use by at least one remote processing device; and providing a data analytics platform comprising: a plurality of profiles, the plurality of profiles being related to at least one operating system, at least one application, or to both the at least one operating system and the at least one application, a plurality of threat feeds and a plurality of detection methods, a plurality of whitelists, a facility for allowing a plurality of users to collaborate in a cyber intrusion investigation, secure storage, a sandbox for testing detection methods, and feedback analytics.

Some embodiments described herein may provide at least one processing device for cyber intrusion investigations, the at least one processing device comprising: at least one processor; a memory having instructions stored therein for execution by the at least one processor; a storage device for storing data; and a communication bus connecting the at least one processor with the read only memory and the storage device. When the instructions are executed by the at least one process of the at least one processing device, a method is performed comprising: communicating with at least one remote processing device via a secure web services application program interface, providing a graphical user interface for formulating queries and displaying artifacts related to anomalous conditions, providing storage for whitelists and detected anomalies, the whitelists comprising information related to normal known, or trusted, conditions, and requesting and receiving information regarding artifacts and data structures found in a memory sample.

In some embodiments, the method may further include providing a plurality of analysis methods for evaluating a state of a target processing device, the plurality of analysis methods performing at least one of determining differences from a known good state, detecting indications of known attacker activity, detecting indications of malware being present, detecting heuristics associated with suspicious activity, detecting discrepancies in logical relationships among the reconstructed artifacts, and determining whether policies or standards have been violated.

In some embodiments, the method may further include communicating with at least one second processing device to request extraction and analysis of a memory sample from a target processing device, the analysis being based on at least one of a plurality of detection methods accessible from the at least one second processing device; receiving, from the at least one second processing device, information regarding indications of an attack, suspicious activity, or detected anomalies; and presenting the information regarding indications of an attack, suspicious activity, or detected anomalies.

In some embodiments, the method may further include providing a facility for bookmarking and annotating artifacts.

In some embodiments, the method may further include providing a user an ability to develop custom workflows.

In some embodiments, the method may further include providing a facility for importing, generating, managing, and/or sharing detection methods for anomalous conditions using information related to presented artifact information.

In some embodiments, the method may further include providing a view that graphically visualizes and permits interactive exploration of temporal relationships among memory resident artifacts.

In some embodiments, the graphical user interface may provide a view that interactively disassembles instructions within the memory sample.

In some embodiments, the graphical user interface may provide a view that graphically and automatically traverses memory resident data structures stored in the memory sample.

In some embodiments, the graphical user interface may provide a string view that includes contents of regions of a memory sample including a string, the string view including information regarding processes or modules including the string.

In some embodiments, the graphical user interface may provide a color-coded view that highlights particular types of information in the memory sample using respective colors.

In some embodiments, the method may further include reconstructing a control flow of a computing machine, based on data and instructions found in the memory of the computing machine, in order to emulate execution of the instructions found in the memory.

Some embodiments described herein may provide a non-transient computer-readable medium having instructions stored therein for execution by at least one processor, when the instructions are executed by the at least one processor a method is performed comprising: extracting data from a specified range of a volatile memory of a target computing machine or processing device; reconstructing data structures and artifacts from the extracted data; and generating and presenting a visualization of the reconstructed data structures and the reconstructed artifacts.

In some embodiments, the method may further include providing a plurality of analysis methods for evaluating a state of the target computing machine or processing device, the plurality of analysis methods performing at least one of determining differences from a known good state, detecting indications of known attacker activity, detecting indications of malware being present, detecting heuristics associated with suspicious activity, detecting discrepancies in logical relationships among the reconstructed artifacts, and determining whether policies or standards have been violated.

In some embodiments, the plurality of analysis methods may include scripts, database queries, byte sequence signatures, string matching, and comparison of registry key values.

In some embodiments, the method may further include presenting indications of suspicious activity or indications of abnormal conditions to a user; and providing a facility for the user to bookmark and annotate artifacts.

In some embodiments, the method may further include correlating information within the volatile memory with data stored in at least one other data source to determine existence of inconsistencies or anomalies.

In some embodiments, the method may further include providing a graphical user interface and a scriptable interface for formulating queries and performing other types of analysis.

In some embodiments, the method may further include generating, managing, and/or sharing detection methods for detecting anomalous conditions using artifacts displayed with the graphical user interface.

In some embodiments, the method may further include importing at least one other detection method for detecting the anomalous conditions using the artifacts displayed with the graphical user interface.

In some embodiments, the method may further include collecting metrics regarding effectiveness of the detection algorithms; and sending the collected metrics to at least one other processing device for remote analytics.

In some embodiments, the method may further include automatically evaluating capabilities of memory resident executables and associated file formats by analyzing imported libraries and exported methods for inconsistencies or anomalies.

In some embodiments, the method may further include providing a facility to associate a response action with at least one analytic pattern.

In some embodiments, the response actions may include at least one of querying new types of data, modifying data, generating an alert, and/or halting a process.

In some embodiments, the method may further include importing or generating whitelists of normal known, or trusted, conditions; sharing the whitelists; and managing the whitelists.

In some embodiments, the method may further include extracting metadata based on the extracted data; and storing the metadata, the metadata describing a system state and including a subset of original runtime state information.

In some embodiments, the method may further include providing a facility for distributing the stored metadata to a group of users.

In some embodiments, the method may further include reconstructing data stores based on data found in cached memory of the computing machine or processing device.

BRIEF DESCRIPTION OF THE DRAWINGS

Aspects of the present disclosure are best understood from the following detailed description when read with the accompanying figures.

Figure 6A:
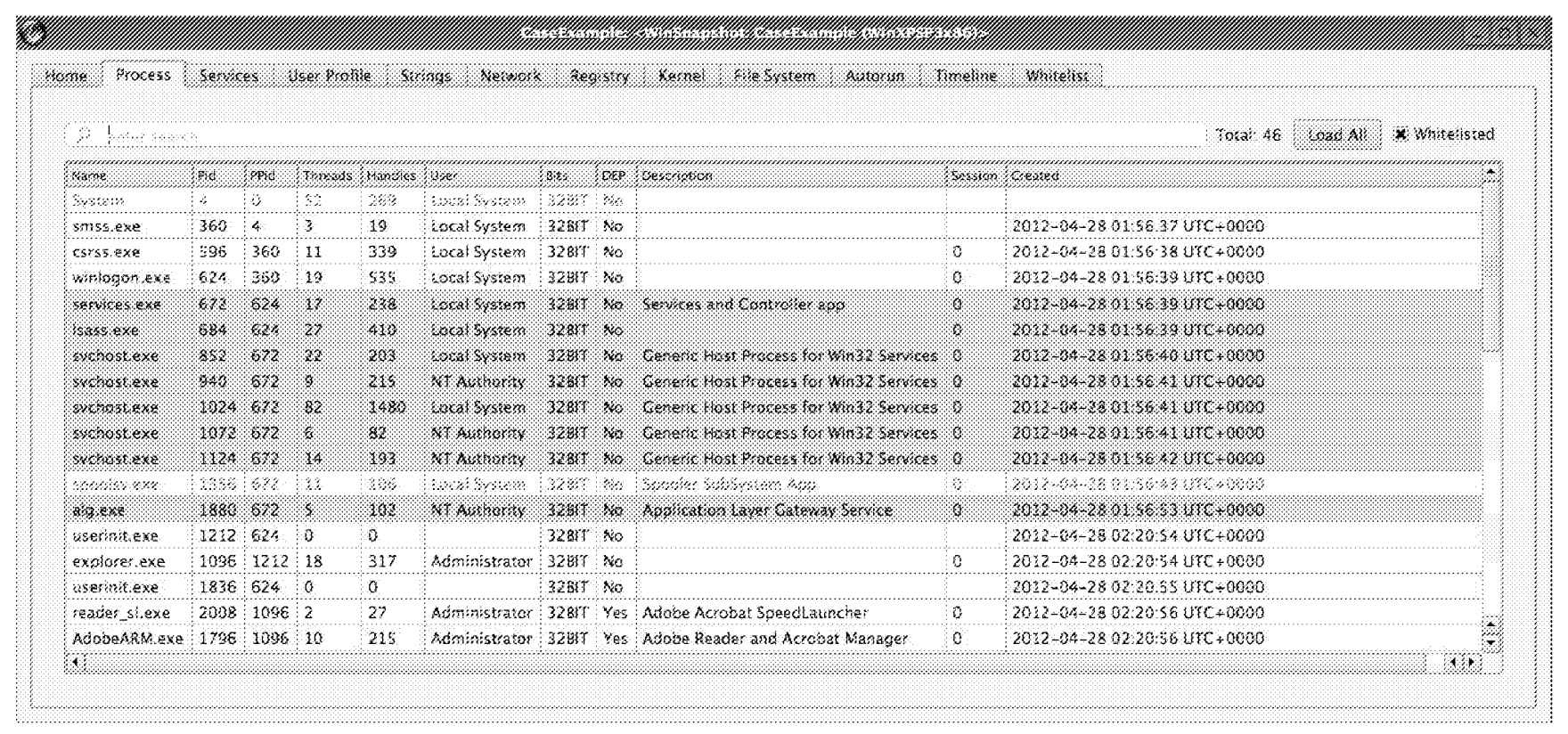
Figure 6B:
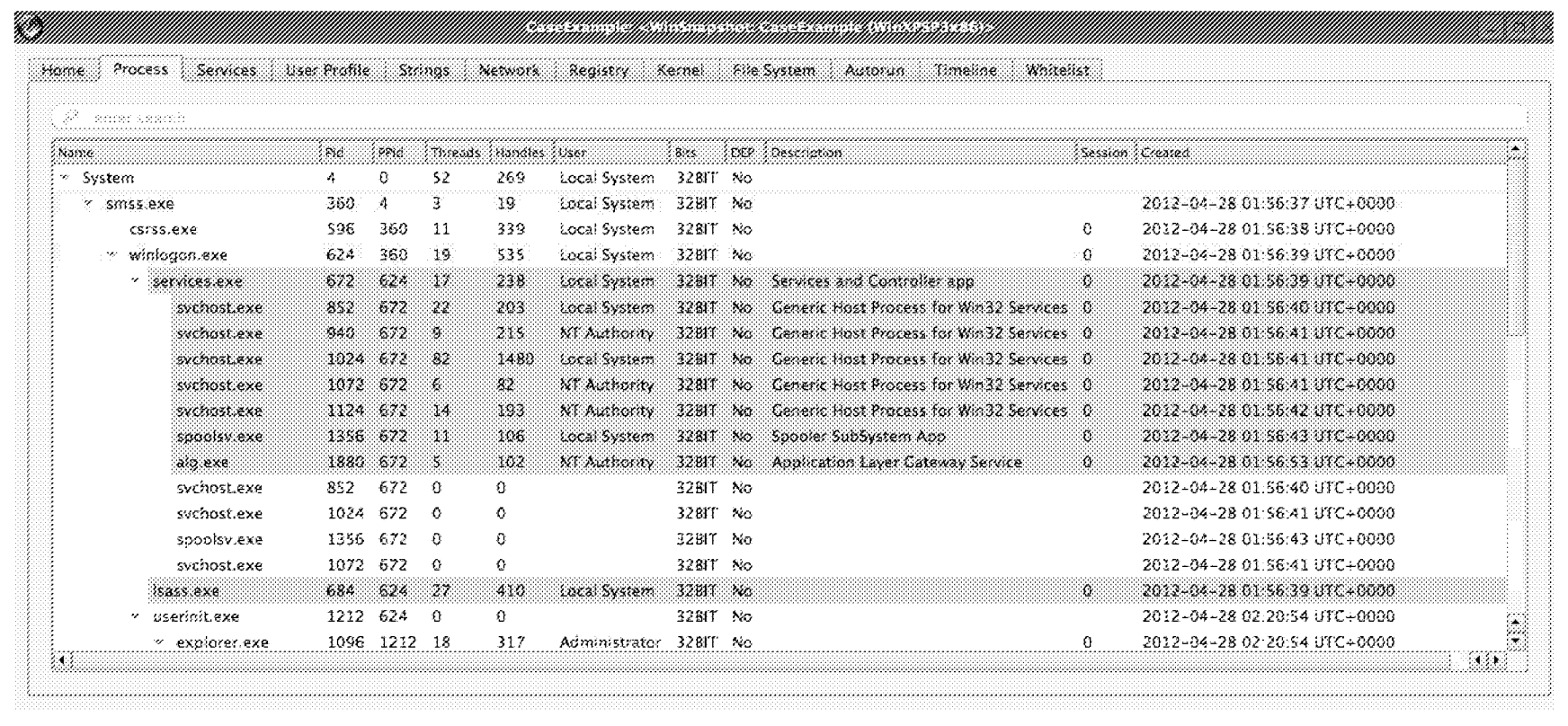
Figure 6D:
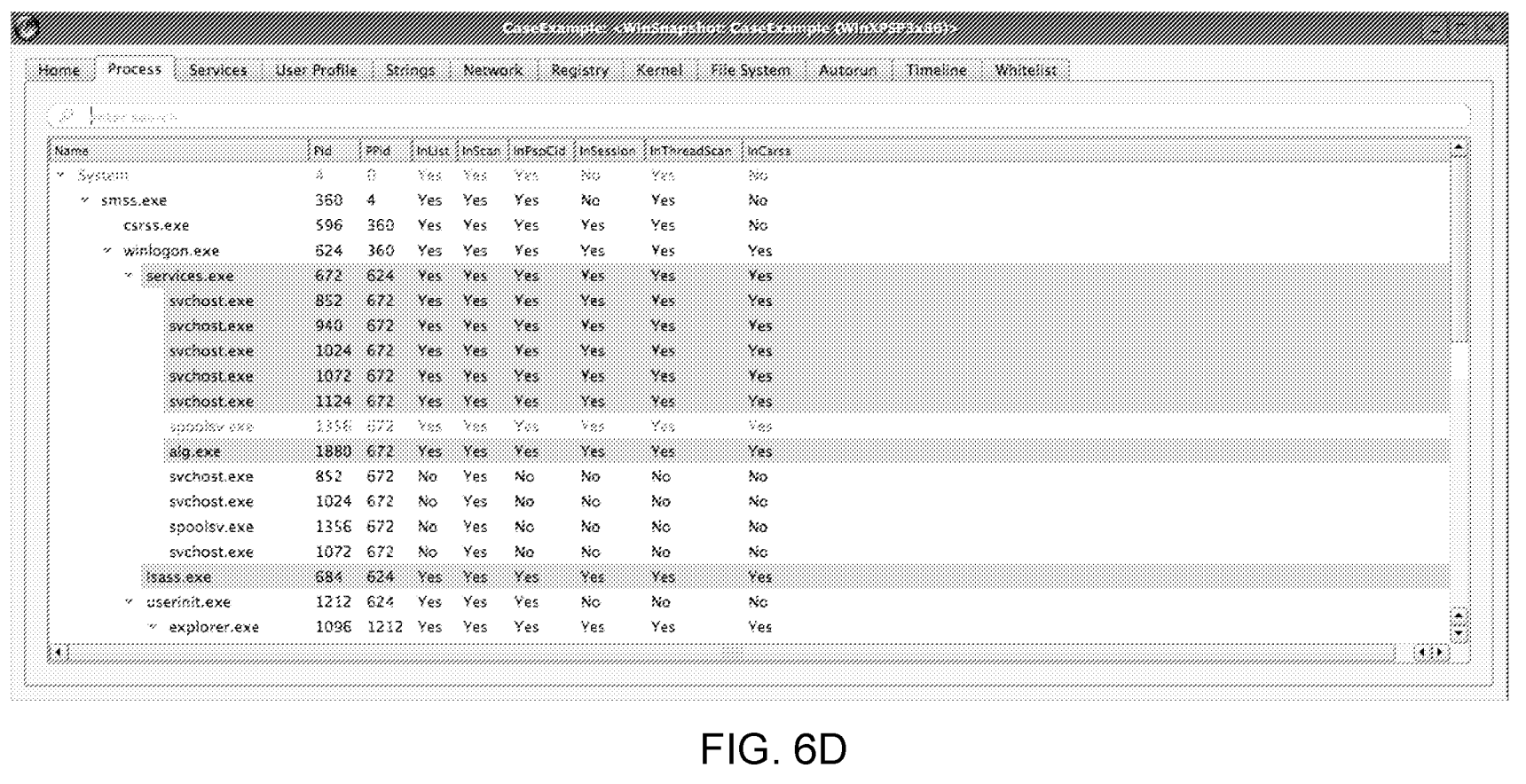

FIGS. 6A-6D are illustrations of an exemplary process table visualization in accordance with various embodiments of the systems, methods, and/or devices described herein.

FIG. 7 is an illustration of an exemplary services table visualization in accordance with various embodiments of the systems, methods, and/or devices described herein.

FIG. 8 is an illustration of an exemplary user profile table visualization in accordance with various embodiments of the systems, methods, and/or devices described herein.

FIG. 9 is an illustration of an exemplary strings table visualization in accordance with various embodiments of the systems, methods, and/or devices described herein.

FIG. 10 is an illustration of an exemplary network table visualization in accordance with various embodiments of the systems, methods, and/or devices described herein.

FIG. 11 is an illustration of an exemplary registry table visualization in accordance with various embodiments of the systems, methods, and/or devices described herein.

FIG. 12 is an illustration of an exemplary kernel table visualization in accordance with various embodiments of the systems, methods, and/or devices described herein.

FIG. 13 is an illustration of an exemplary file system table visualization in accordance with various embodiments of the systems, methods, and/or devices described herein.

DETAILED DESCRIPTION

Figure 1A:
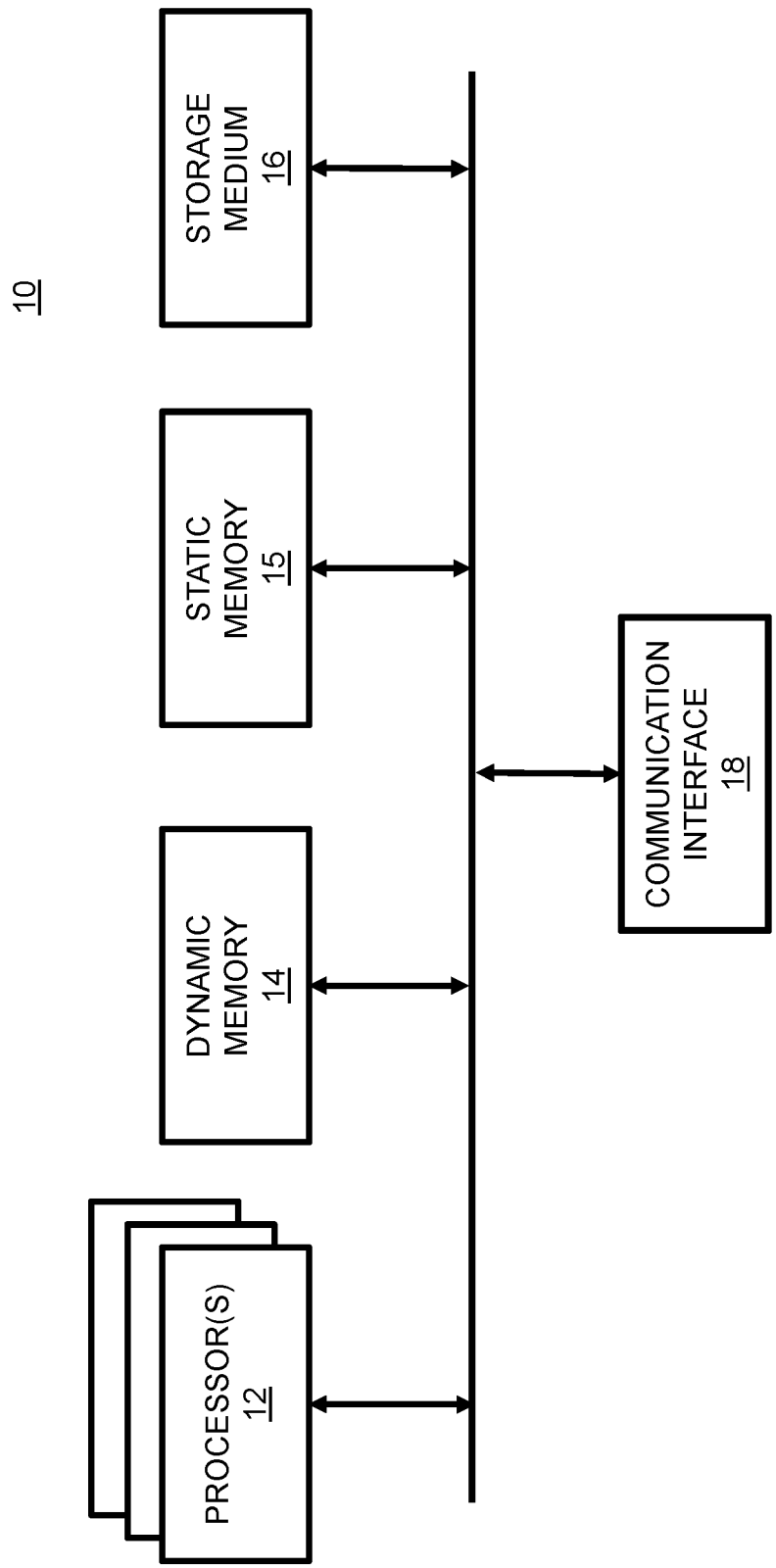
FIG. 1A is a block diagram of an exemplary processing device, which may be used to implement various embodiments of the systems, methods, and/or devices described herein.

The present disclosure is described in further detail with reference to one or more embodiments, some examples of which are illustrated in the accompanying drawings. The examples and embodiments are provided by way of explanation and are not to be taken as limiting to the scope of the disclosure. Furthermore, features illustrated or described as part of one embodiment may be used by themselves or as part of other embodiments and features illustrated or described as part of one embodiment may be used with one or more other embodiments to provide further embodiments. The present disclosure covers these variations and embodiments as well as other variations and/or modifications.

The term "comprise" and its derivatives (e.g., comprises, comprising) as used in this specification and throughout the claims is to be taken to be inclusive of features to which it refers, and is not meant to exclude the presence of additional features unless otherwise stated or implied. As used in this specification and throughout the claims that follow, the meaning of "a," "an," and "the" includes plural reference unless the context clearly dictates otherwise. Also, as used in this specification and throughout the claims that follow, the meaning of "in" includes "in" and "on" unless the context clearly dictates otherwise. Finally, as used in the specification and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included for the ease of reference of the reader and should not be used to limit the subject matter found throughout the disclosure or the claims. The subject headings should not be used in construing the scope of the claims or the claim limitations.

The present disclosure describes processor-implemented systems, methods, and/or devices for evaluating, analyzing, and visualizing abnormal conditions. For example, the systems, methods, and/or devices for evaluating, analyzing, and visualizing abnormal conditions described herein may operate to detect abnormal conditions in a system's runtime state across one or more computing machines. Examples of the systems, devices, and methods are provided herein and are intended to be non-limiting illustrations of novel runtime state evaluation and analysis techniques.

As used herein, in some embodiments, an abnormal, suspicious and/or anomalous condition may include any combination of one or more of: unexpected differences relative to a previous known good state (e.g., an unusual processes, services, files, registry keys, etc); unexpected differences relative to similarly configured systems (e.g., unusual processes, services, files, registry keys, etc); foreign or unexpected code or instructions loaded in memory, indications of known attacker activity (suspicious network activity or commands); indications of malware persistence mechanisms, discrepancies in logical relationships among the reconstructed artifacts and/or data structures; indications of unexpected temporal events and/or clusters of events; and violations of an organization's policies or configuration standards (e.g., unauthorized remote access services, weak password requirements, etc.).

In general, when a computing machine has been identified as having suspicious activity or a user wants to proactively evaluate the state of a computing machine, the systems, methods, and/or devices described herein may be used to validate the suspicious activity, identify any related artifacts, and/or investigate the cause of the activity. In some embodiments, the user may either collect a memory sample from the computing machine or allow the systems, methods, and/or devices described herein to access the live memory of the suspected (or target) computing machine directly. The systems, methods, and/or devices described herein may then utilize the raw data found in memory and, in some embodiments, support auxiliary data to identify indications of anomalous, suspicious and/or abnormal activity. As is more fully described throughout this description, the analysis may happen in many different ways. For example, the systems, methods, and/or devices described herein may extract suspicious artifacts from the data directly (e.g., a physical address space 314 described in FIG. 3) or the systems, methods, and/or devices described herein may reconstruct the virtual memory by e.g., emulating the hardware's memory management algorithms (e.g., a virtual address space 318 described in FIG. 3). In the different types of analysis, the systems, methods, and/or devices described herein may apply extra context (e.g., hardware, operating system, application, threat intelligence, etc.) in addition to extracting memory resident artifacts. For example, in some embodiments, once the systems, methods, and/or devices described herein have reconstructed the virtual memory management they may apply operating system context in the form of operating system (OS) Profiles 308 (described in FIG. 3) and application profiles 310 (described in FIG. 3). In some embodiments, these profiles may provide information about the operating system or applications data structures and expecting functionality. Once all the artifacts have been collected the systems, methods, and/or devices described herein may visualize the artifacts to a user and enable the user to run analysis algorithms to look for anomalous conditions or items of interest. Furthermore, in some embodiments, once these artifacts are identified, the systems, methods, and/or devices described herein may enable a user to continue to investigate, collaborate, annotate, and identify other related artifacts. In some embodiments, based on the analysis, the systems, methods, and/or devices described herein may enable a user to verify the state of the computing machine and identify memory resident artifacts that may be pertinent to a particular investigation.

FIG. 1A illustrates a block diagram of an exemplary processing device 10, which may be used to implement various embodiments of the systems, methods, and/or devices described herein. The processing device 10 may be a server, a personal computer (PC), a workstation, a mobile device or another type of processing device. Processing device 10 may be a physically located within a single device, or may be distributed across multiple devices. In some embodiments, the processing device may include one or more processors 12, a dynamic memory 14, a static memory 15, a storage medium 16, a communication interface 18, and/or a communication bus 20 interconnecting the various components of processing device 10.

In some embodiments, the dynamic memory 14 may include, for example, volatile memory such as random access memory (RAM) or other dynamic non-transient machine-readable storage medium. Static memory 15 may include, for example, a read only memory (ROM) or other non-transient static machine-readable storage medium. In some embodiments, dynamic memory 14, or another type of dynamic machine-readable storage medium, may store instructions as well as temporary variables or other intermediate information used during execution of instructions by one or more processors 12. Static memory 15, or another type of static machine-readable storage medium, may store static information and instructions for execution by processor 12.

The processing device 10 may further include one or more processors 12. In some embodiments, the one or more processors 12 may include one or more conventional processors that interpret and execute instructions (e.g., from dynamic memory 14 and/or static memory 15). Some embodiments of processing device 10 may further include a hardware logic component, including, for example, an application specific integrated circuit (ASIC) and/or a field programmable gate array (FPGA) that may be combined with instructions in static memory 15 or dynamic memory 14 to cause processing device 10 to perform a method.

In processing device 10 may further include a storage device 16 which may include a non-transient machine-readable storage medium such as, for example, a magnetic disk, a writable optical disc, a flash RAM device, or other type of non-transient machine-readable storage medium for storing data, instructions, or other information. Other non-limiting examples of storage device 16 may also include Digital Video Disk (DVD), compact Disk (CD), or other types of storage devices that use other types of non-transient machine-readable storage media for storing data and/or instructions for later use.

In some embodiments, processing device 10 may communicate with other devices via a communication medium, which may include, but not be limited to a propagated signal on a carrier wave. For example, processing device 10 may perform functions in response to one or more processors 12 executing sequences of instructions contained in a non-transient machine-readable storage medium. In some embodiments, the sequences of instructions may be read into the non-transient machine-readable storage medium from another non-transient machine-readable storage medium or from a separate device via communication interface 18 and the communication medium.

Figure 1B:
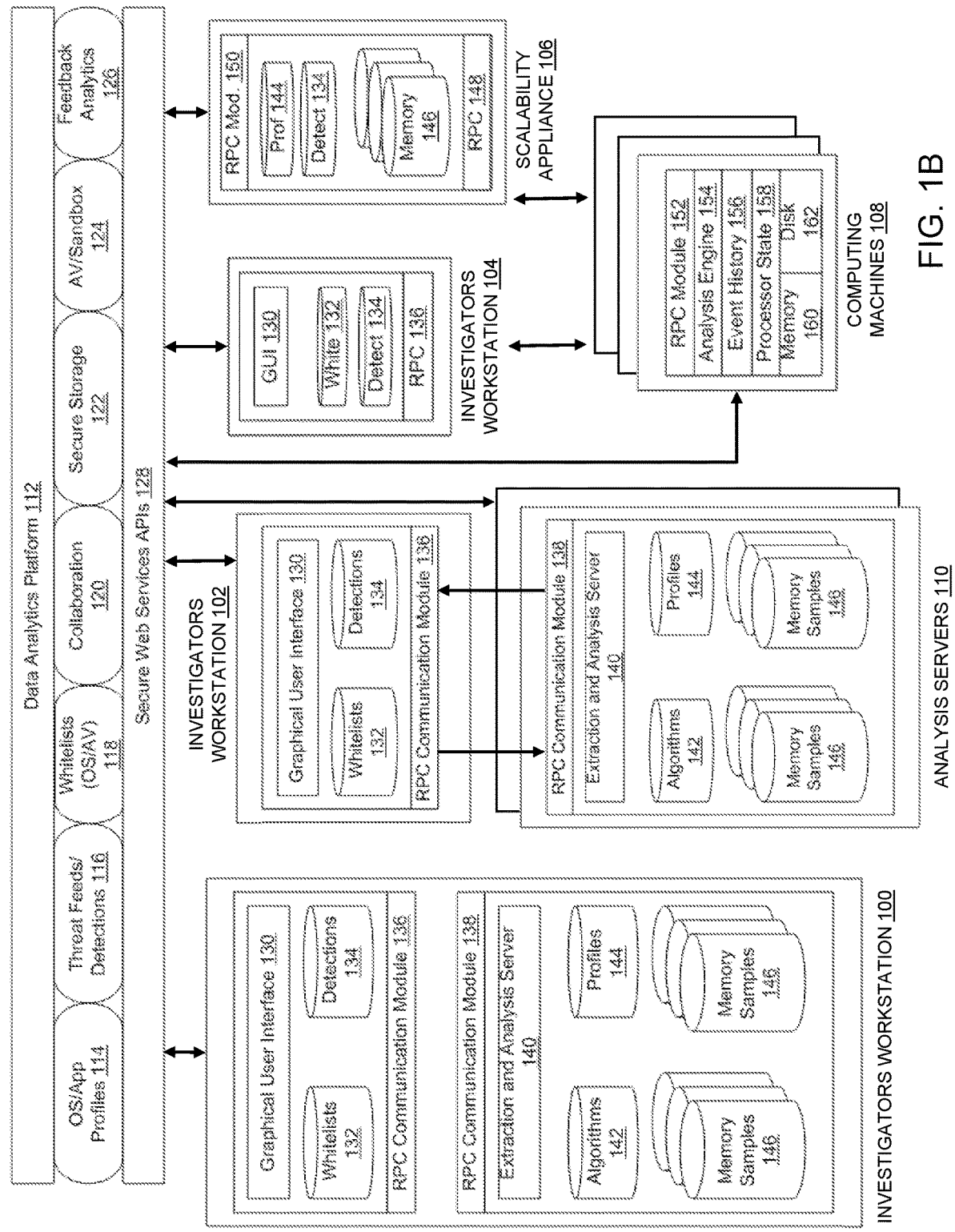
FIG. 1B is a schematic representation of an exemplary architecture that may be used to implement various embodiments of the systems, methods, and/or devices described herein.

FIG. 1B is a schematic representation of an exemplary architecture that may be used to implement various embodiments of the systems, methods, and/or devices described herein. As illustrated, the architecture may include one or more data analytics platforms 112, one or more investigator workstations 100, 102, 104, one or more analysis servers 110, one or more computing machines 108, and a scalability appliance 106. In some embodiments, the various elements of the illustrated architecture may be implemented using e.g., the processing device 10 illustrated in FIG. 1A.

Generally, FIG. 1B illustrates an exemplary architecture of an analysis system that may be used to interrogate, manage, and/or evaluate the live runtime state information from one or more computing machines 108 or runtime state information previously collected (e.g., across an enterprise) for indications of abnormal conditions. In some embodiments, the analysis system may also be configured to archive and track changes in the state of one or more computing machines 108 over time that may indicate abnormal conditions.

The data analytics platform 112 may be configured to provide one or more services to the various other components of the architecture. For example, the data analytic platform may include any combination of one or more of operating system (OS)/application (app) profiles 114, threat intelligence feeds/detections 116 whitelists for OS, applications, antivirus (AV) 118 or other security software, collaboration tools 120, secure storage 122, AV/sandbox 124, and/or feedback analytics 126. In some embodiments, investigator workstations 100, 102, 104, scalability appliance 106, one or more computing machines 108 and/or one or more analysis servers 110 may use secure web services APIs 128 to request services provided by data analytics platform 112.

In some embodiments, one or more investigator workstations 100 may be coupled to the data analytics platform 112 and configure to enable a user to interface with the systems, methods, and/or devices described herein. The investigator workstation may include a graphical user interface 130, one or more whitelists databases 132, remote procedure call (RPC) communication modules 136, 138, extraction and analysis server 140, one or more algorithms databases 142, one or more profiles databases 144, and one or more memory samples databases 146.

In some embodiments, the graphical user interface 130 may be the component of the system used to visualize data that was collected and provide an interface for the user to interact with and correlate the data that was collected. The whitelist databases 132 may be used to store information about what is normally found or what a user should expect to find within the runtime state of a particular computing machine. For example, in some embodiments, the whitelist database 132 may include artifacts (e.g., files, registry keys, mutexes, etc.) created by legitimate components of the operating system or authorized software that is running on the computing machine (e.g., security software, third party browsers, email clients, chat programs, etc.). Whitelists may also be used to annotate the data presented to a user so the user can quickly identify or distinguish between normal/expected artifacts and outliers. The detections data store 134 may contain information about suspicious or anomalous activity that should be brought to the attention of the user (e.g., automatically brought to the user's attention). In some embodiments, this information may include process names associated with previous malware variants and/or IP addresses controlled by malicious actors or threat groups. In some embodiments, the user may also augment the detection data store during the course of an investigation to catalog items that should be looked for in the future. The RPC communication module 136 may be used to interface between the portion of the system the user interacts with and the portion of the system performing extraction and analysis. In some embodiments, the RPC communication module may enable the system to be decoupled to take advantage of high-powered hardware that may be located remotely relative to the user. The RPC communication module 138 on the extraction and analysis server 140 may be configured to accept queries from the user interface related to what analysis should be performed and may provide information about the status of that analysis back to the user. In some embodiments, the extraction and analysis server 140 may be the component/portion of the system used to extract artifacts from the memory sample. The algorithms repository 142 may contain a collection of code algorithms that are used to locate, reconstruct, and extract artifacts from the memory data. The profiles repository 144 may contain samples of specific operating system and application meta-data that may be used to annotate and facilitate the analysis. The memory samples data store 146 may be repositories of samples that the system is processing and/or has previously processed.

In some embodiments, the graphical user interface 130 may have access to whitelists databases 132 and detections databases 134 and may be configured to communicate with the extraction and analysis server 140 via RPC communication modules 136, 138. Extraction and analysis server 140 may have access to algorithms database 142, profiles database 144, and memory samples database 146.

In an alternative configuration, in some embodiments, the functionality of investigator workstation 100 may be separated into an investigator workstation 102 and an analysis server 110. Accordingly, as illustrated, the workstation 102 may include a graphical user interface 130, which has access to one or more whitelists databases 132 and one or more detections databases 134. Investigator workstation 102 may further include RPC communication module 136. One or more analysis servers 110 may be coupled to a corresponding investigator workstation 102 and may include RPC communication module 138 and extraction and analysis server 140, which has access to one or more algorithms databases 142, one or more profiles databases 144, and one or more memory samples databases 146. In some embodiments, workstation 102 and one or more analysis servers 110 may communicate with each other via RPC communication module 136 and RPC communication module 138, respectively. In some embodiments, one or more analysis servers 110 may request web services via RPC communication module 138 and secure web services APIs.

In another alternative configuration, investigator workstation 104 may be coupled to a one or more computing machines and/or one or more scalability appliances. As illustrated, the investigator workstation 104 may include a graphic user interface 130, which has access to one or more whitelists databases 132 and one or more detections databases 134. Investigator workstation 104 may communicate with scalability appliance 106, secure web services APIs 128, and one or more computing machines 108 via RPC communication module 136.

In some embodiments, the scalability appliance 106 may be used when analyzing a large distributed network environment (e.g., a distributed network of computing machines). For example, one or more scalability appliances 106 may be deployed in a customer's environment to help manage any combination of one or more of collaboration, storage, profiles, detections, whitelists, and/or tasking agents on various processing devices. A user may connect into scalability appliance 106 as opposed to connecting directly to processing devices in an organization. As illustrated, scalability appliance 106 may include an RPC communications module 150, one or more profiles databases 144, one or more memory databases 146 and an RPC communication module 148. RPC communication module 150 may be configured to make calls to secure web services APIs 128 to request services from data analytics platform 112. RPC communication module 148 may be configured to make calls to one or more computing machines 108 to obtain information from analysis engine 154.

In some embodiments, the one or more computing machines 108 may be an end point on which live memory may be processed. One or more computing machines 108 may include an RPC communication module 152, an analysis engine 154, an event history 156, a processor state 158, memory 160, and a storage medium including but not limited to disk 162. The RPC communication module 152 may make calls to secure web services APIs 128. Analysis engine 154 may be similar to extraction and analysis server 140. However, in some embodiments, analysis engine 154 may differ from extraction and analysis server 140 in that analysis engine 154 may execute on a processing device being analyzed and/or analyzes live memory as opposed to memory samples. In the case of analyzing live memory, the extraction and detection algorithms may be analyzing the actual content of memory dynamically and in real time as opposed to sampling the state of memory, writing that data to secondary storage, and analyzing the contents offline. Since the data being analyzed changes as the computing machine operates, in some embodiments, the algorithms may be designed to handle the state changes. In this configuration, the RPC module 152 may also accept queries about the current state of the system (e.g., the computing machine in this embodiment) such as event history 156, processor state 158, memory 160, and disk 162.

Figure 2:
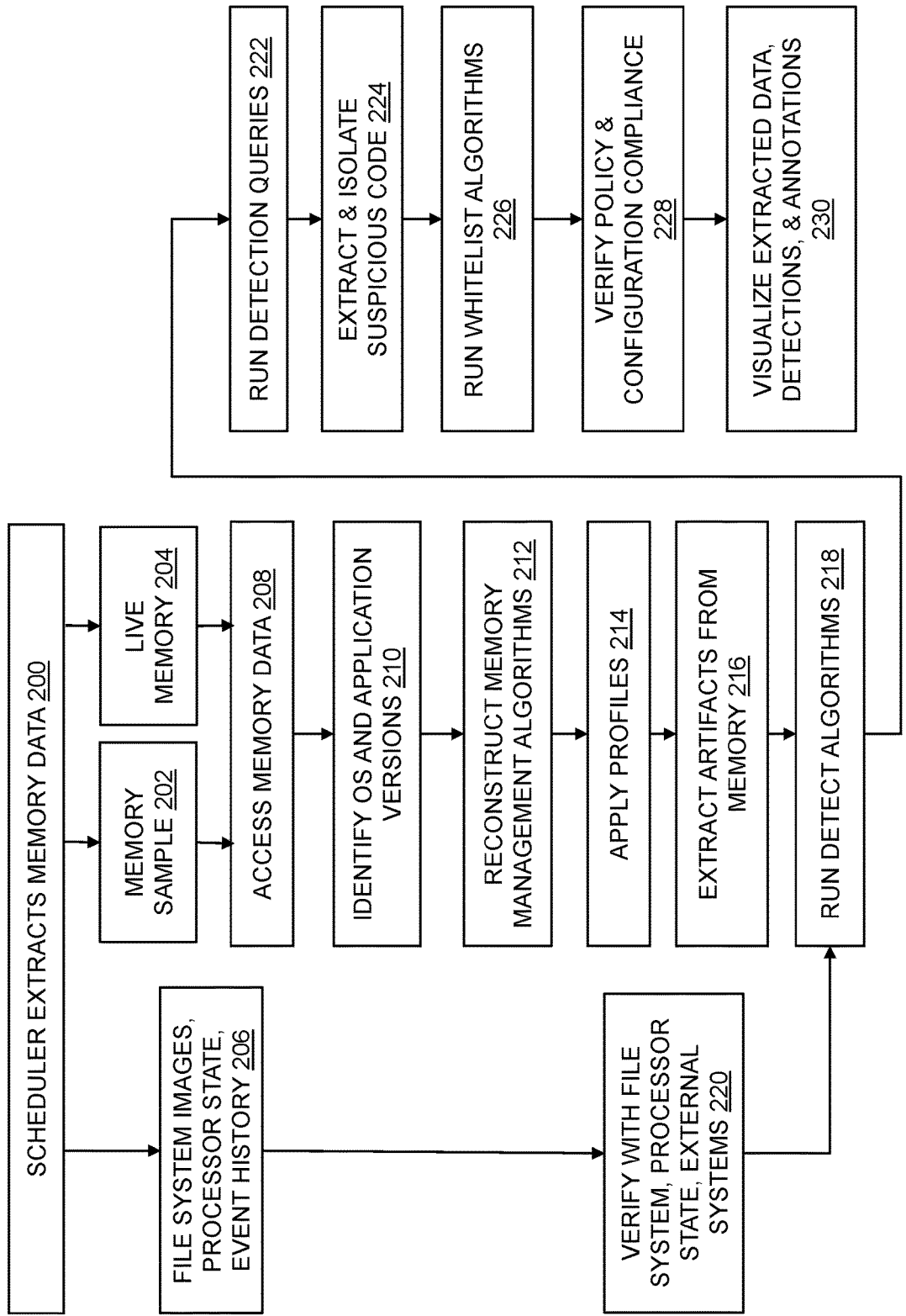
FIG. 2 is a flowchart of an exemplary process for detecting and analyzing one or more computer systems that may be suspected of, or exhibiting, indications of anomalous conditions in accordance with some embodiments described herein.

FIG. 2 is a flowchart of an exemplary process for detecting and analyzing one or more computer systems that may be suspected of, or exhibiting, indications of anomalous conditions in accordance with some embodiments described herein. In some embodiments, the process may begin at operation 200 in which a scheduler initiates and/or causes the extraction of memory data. In some embodiments, the memory sample 202 may be stored and/or live memory data 204 may be utilized. In some embodiments, data extraction may involve leveraging hardware, software or virtualization capabilities to provide random access to data stored in volatile memory. For example, this may involve to the ability to read arbitrary amounts of data from specified offsets within memory. In the case of a memory sample 202, the data may be read sequentially and written to another storage device. However, in the case of the live memory access 204, the analysis may only accesses the specific data needed by the particular algorithms.

Next, in operation 208, an analysis server 140 or analysis engine 154 may access the memory data which may be a memory sample 202 accessed by extraction and analysis server 140 or live memory 204 accessed by analysis engine 154. In operation 210, the OS and application versions of the memory sample 202 and/or live memory 204 may be identified. Extraction and analysis server 144 or analysis engine 154 may then reconstruct memory management algorithms at operation 212 and may apply OS/App profiles at operation 214. In some embodiments, operation 212 (reconstruct the memory management algorithms) may include emulating the algorithms used by the target computing machine's processor that create virtual memory. As a result, the system may determine which processes or applications from the target computing machine were able to access the corresponding data in memory. This may be desirable in some embodiments, because it allows users to associate certain data in memory (e.g., images, documents, chat messages, etc.) with the software and/or user accounts that created or viewed the data. Operation 214 (applying the OS/Application profiles) may allow the systems, methods, and/or devices described herein to interpret the data structures and meta information residing in memory in the same or similar manner as the operating system or application being analyzed. In some embodiments, the OS/App profiles 114 may be obtained by communicating with the data analytics platform 112 as illustrated in FIG. 2. Extraction and analysis server 140 or analysis engine 154 may then identify and extract artifacts from memory at operation 216 using services provided by data analytics platform 112. Once the OS/Application specific context has been applied, the system may extract artifacts from the memory data at operation 216. Once the relevant artifacts have been extracted, detection algorithms may be run 218 to look for suspicious artifacts and/or artifacts of interest.

In operation 220, the systems, methods, and/or devices described herein may verify file system images, processor state, event history, and information from external systems obtained in operation 206 by comparing them to artifacts extracted from the memory. In some embodiments, the system may be verifying that the data found in these sources is consistent with the artifacts found in memory and/or may be using the data from these alternate sources to augment the data found in memory. For example, when a system is resource constrained it may temporarily store memory data within the file system or it may only load parts of a file into memory. It may also be possible for an attacker to modify memory resident versions of data typically found within the file system of a computing machine. Accordingly, in some embodiments, this additional data may be used to augment and/or correlate the data found in memory. Next, at operation 222, detection queries may be run. In some embodiments, the detection queries may be logical expressions used to codify anomalous relationships between extracted artifacts. In some embodiments, the queries may be run against the artifacts that were previously extracted. As a result of running detection queries and detection algorithms, suspicious code may be extracted and isolated in operation 224. Next, at operation 226 and 228, extraction and analysis server 144 or analysis engine 154 may run whitelist algorithms and may verify policy and configuration compliance. As described herein, whitelist algorithms may be used to demarcate an anomalous conditions (detections) that may actually be normal and provide context as to artifacts that are normally found on the particular type of computing device. When verifying policy and configuration compliance the artifacts extracted from memory may be compared against the typical policies and configurations used to make sure they remain in compliance. Extracted data, detections and annotations may then be visualized on an analyst's workstation, in operation 230. Once the extracted data has been dispositioned, it is rendered on a user interface so it can also be manually reviewed and verified. In some embodiments, the user may also have the ability to add annotations to the collected artifacts.

Figure 3:
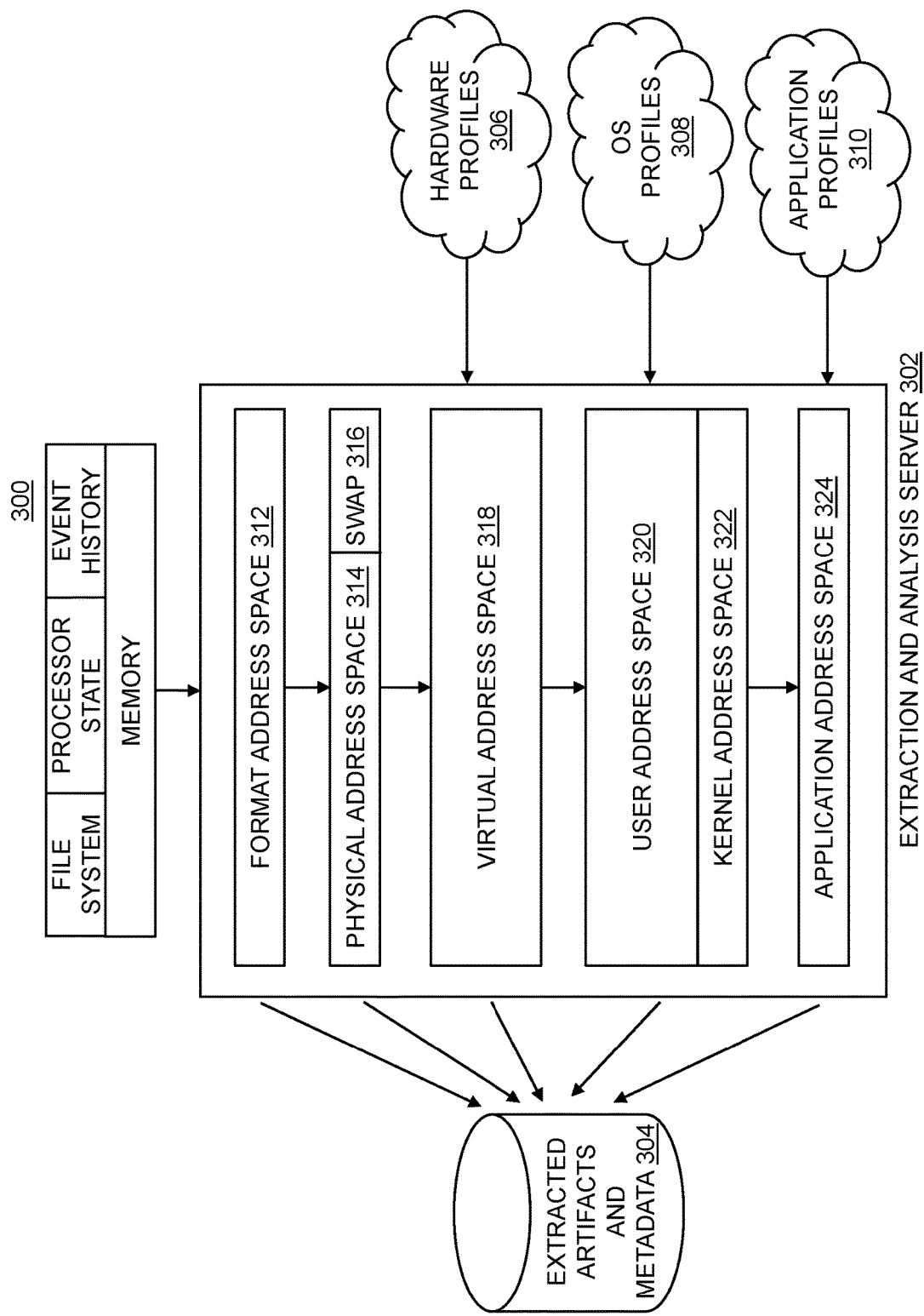
FIG. 3 is a block diagram of an exemplary extraction and analysis server which may be used to implement various embodiments of the systems, methods, and/or devices described herein.

FIG. 3 is a block diagram of an exemplary extraction and analysis server which may be used to implement various embodiments of the systems, methods, and/or devices described herein. As discussed above, the extraction and analysis server may be implemented as part of the investigator workstation 100 or the analysis server 110. In addition, in some embodiments, the analysis engine 154 may be functionally similar to the extraction and analysis server. FIG. 3 represents the different types of analysis that may be performed and illustrates the types of external context that may be applied to augment the various analyses. In some embodiments, extraction and analysis server 302 may also receive file system information, processor state information, event history, and memory samples extracted from computing devices for analysis. As illustrated, the extraction and analysis server 302 may include components for processing and reconstructing formatted address space 312. In some embodiments, this analysis may comprise accessing auxiliary data that may be stored in the file formats that a memory sample may be stored within. For example, system information stored within a crash dump file format or a virtualization file format may store information about the particular computing machine the data was collected from (e.g., size of memory, operating system version, etc). The next stage of analysis may be done across the physical address space 314 which may be a range of discrete addresses used to represent the underlying physical memory of the system. In this analysis, algorithms may scan the physical address space looking for specific artifacts. By leveraging hardware profiles 306, which describe the characteristics of the processors' memory management features and hardware related data structures and algorithms that are used to reconstruct the virtual memory management state of the computing machine, it may be possible to map artifacts to the owning processes by analyzing the virtual address spaces 318. In another stage of analysis, operating system profiles 308 may be used to add context about how the operating system is built including data structures, conventions, algorithms, and/or symbols. As a result, it may be possible to reconstruct the state of the operating system including the separation of user land 320 and kernel land 322 artifacts. In some embodiments, it may also be possible to include swap data 316 which is a component of the memory management functions that is operating system specific. At this stage it may also be possible to follow any pointers or virtual addresses that are found within operating systems data structures. Once the user land address space 320 is rebuilt, the systems, methods and/or devices described herein may leverage application profiles 310 to reconstruct the state of the application and extract application specific artifacts from the application's address space 324. Hardware profiles 306, operating systems profiles 308, and application profiles 310 may be provided by data analytics platform 112 via secure web services APIs 128.

Figure 4:
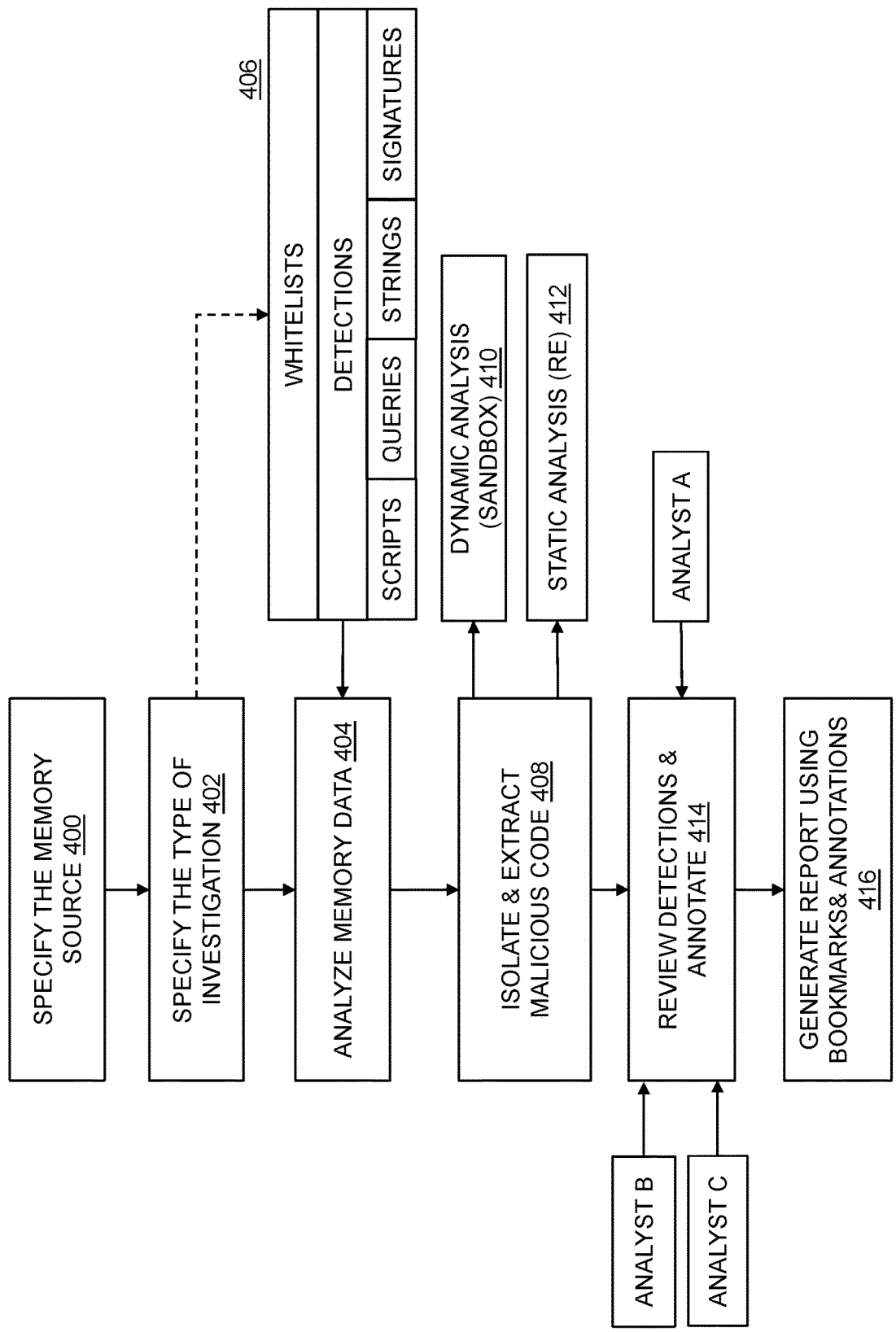
FIG. 4 is a flowchart of an exemplary process for detecting and analyzing one or more computer systems that may be suspected of, or exhibiting, indications of anomalous conditions that may be performed by an investigator workstation in accordance with some embodiments described herein.

FIG. 4 is a flowchart of an exemplary process for detecting and analyzing one or more computer systems that may be suspected of, or exhibiting, indications of anomalous conditions that may be performed by an investigator workstation in accordance with some embodiments described herein. As described above, the investigator workstation may be configured to allow a user to interface with the systems, methods, and/or devices described herein. For example, via a workstation, the user (e.g., Analyst A, B, and/or C) may specify a memory source at operation 400 and may specify a type of investigation at operation 402. In some embodiments, from the graphical user interface 130, a user may select either a local or remote file containing a sample of memory or they may specify a remote computing machines's live memory to access. Then the user may specify a particular type of investigation or workflow the user is planning to perform. Examples of workflows include, for example, investigating a compromised computing machine (e.g., server), investigating a computing machine (e.g., workstation) infected with targeted malware, investigating a computing machine (e.g., workstation) infected with non-targeted malware, looking for specific contraband (e.g., intellectual property, stolen data, illegal images, etc.), and/or investigating a suspect user or a person of interest. By specifying a particular workflow, the graphical user interface enables the user to configure the types of analysis that will be performed on the memory data. For example, by selecting a particular workflow, or through manual selection, the investigator may specify any combination of one or more of the following: whitelists, detection algorithms, scripts, queries, strings, and signatures for use during the investigation at operation 402. The whitelists may provide annotations for the user interface about normal artifacts that a user may expect to find on the particular target computing machine. The detection algorithms may verify that the operating system and applications are working as expected and have not been maliciously modified. Queries may be logical expressions describing anomalous relationships between extracted artifacts (e.g., a process named "lsass.exe" that does not exist in the standard path designated by Microsoft Windows). Scripts may provide a programming interface (API) for more complicated relationships that cannot be expressed with traditional database query logic and the ability to interface with external data sources. Strings and signatures may be used to look for specific byte patterns, regular expressions, and/or CPU operation codes found within the different abstractions of data. Extraction and analysis server may be provided with the specified information 406 and at operation 404, the extraction and analysis server may analyze the data. As part of the analysis, the server may isolate and extract malicious code at operation 408. The malicious code and the memory resident system context may be sent to a static code analysis engine 412 (e.g., a disassembler or decompiler) for reverse engineering to identify what the code was attempting to accomplish. In some embodiments, the code could also be sent to anti-virus engines 124 to see if the code matches any previously known malware or it could be executed or emulated in a dynamic analysis engine 410 to determine what happens when the code is executed. In some embodiments, a user of the systems, methods, and/or devices described herein, may be may be able to review and annotate the detection results by interacting with the user interface (e.g., graphical user interface) provided for the system at operation 414. In some embodiments, a report may be generated by extraction and analysis server or analysis engine using e.g., bookmarks and annotations at operation 416.

Figure 5:
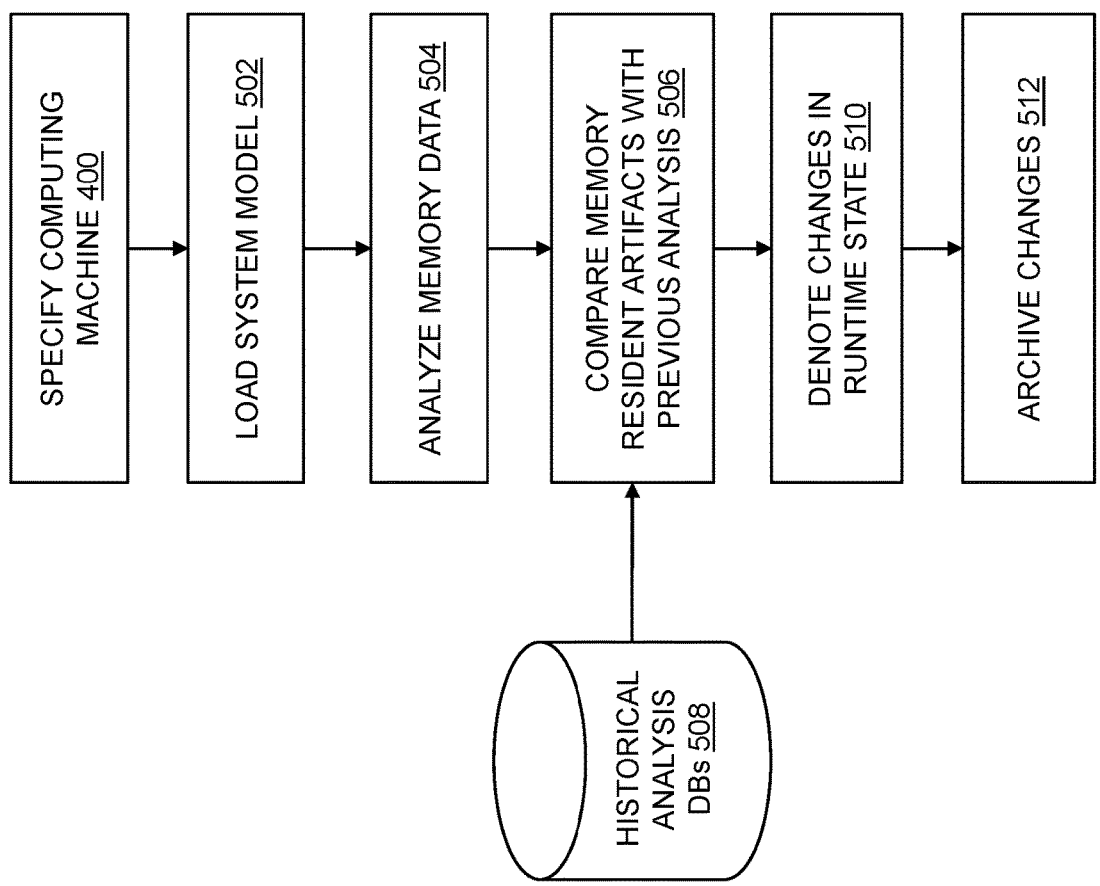
FIG. 5 is a flowchart of an exemplary process for detecting and analyzing one or more computer systems that may be suspected of, or exhibiting, indications of anomalous conditions by collecting and comparing state information over time in accordance with some embodiments described herein.
Figure 6C:
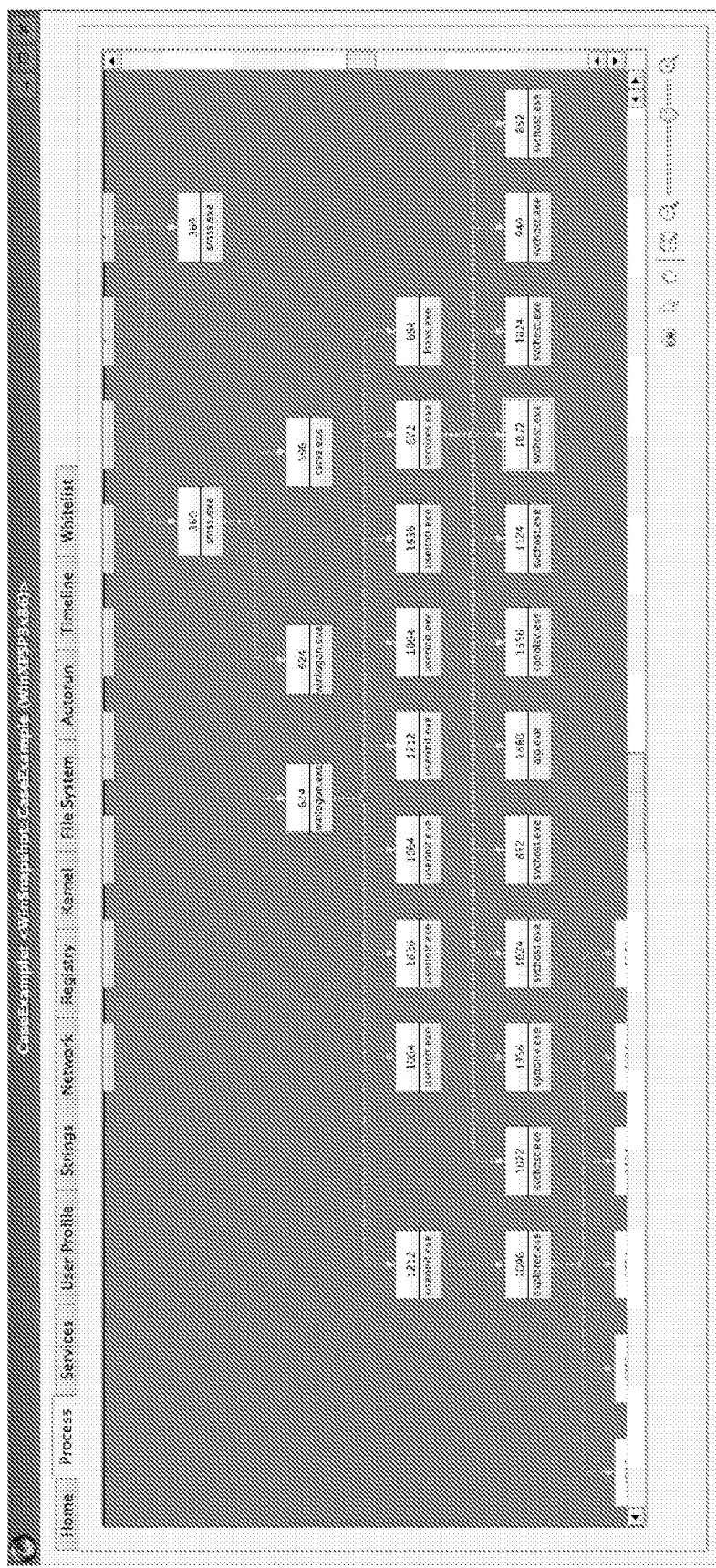

FIG. 5 is a flowchart of an exemplary process for detecting and analyzing one or more computer systems that may be suspected of, or exhibiting, indications of anomalous conditions by collecting and comparing state information over time in accordance with some embodiments described herein. In some embodiments, this may enable a user to compare the current runtime state of the computing machine to that of a previous point in time. Such a comparison may be desirable for helping determine when an unexpected change may have taken place or for having a baseline to identify later arising anomalies. For example, a user may identify that a set of kernel modules or processes were not running when the computing machine was originally installed and thus warrant further investigation. As illustrated, in some embodiments, the process may begin with a user identifying a particular computing machine via a workstation at operation 500. A system model, including e.g., the hardware profiles, the operating system profiles, and/or the application profiles, of the specified computing machine may be loaded into the computing machine at operation 502. An analysis engine on the computing machine may analyze memory data of the computing machine at operation 504 and may compare memory resident artifacts with a previous analysis at operation 506 based on a provided historical analysis database 508. In some embodiments, changes in a runtime state may be denoted in operation 510 and the changes may be archived in operation 512 in the historical analysis database 508. Operations 500-512 may be repeated in a predefined manner to continue to compare resident artifacts with a previous analysis. Depending on the criticality of the system, a user may tune how frequently memory resident data is collected or analyzed from the computing device or have it trigger based upon suspicious events. For example, a user may initiate an analysis when they get an alert from an anti-virus engine or a network intrusion detection system.

As discussed above, the systems, methods, and/or devices described herein may be configured to extract memory information, reconstruct and/or extract data structures and artifacts from the memory and/or present a visualization of the data structure or artifact to a user.

In operation, the systems, methods, and/or devices described herein may issue a request (e.g., an interrogation request) which instructs a data extraction unit to retrieve information from memory (e.g., the runtime state of a remote computing machine or the state of the computing machine based on information that was collected at a previously point in time). Having obtained the memory information, the systems, methods, and/or devices described herein may be configured to analyze the information and extract the artifacts from the information. In some embodiments, the system may be configured to extract multiple types of artifacts from the memory information. In some embodiments, the system may be configured to allow a user to select what types of artifacts to extract from the memory information. For example, once the user selects the type of information they want extracted, they submit the requests to the data extraction unit. This could include a request for information about strings found within a particular region of memory or a request to extracting all network related artifacts (e.g., domain name service information, IP addresses, etc). Once the data extraction unit receives the request it may leverage the different extraction stages found in FIG. 3 to extract the requested data. The data extraction unit may return information about the particular artifact and where the artifact was found. For example, in some embodiments, the system may make queries about the existence of an operating system or application artifacts, about the relationships among the artifacts, or about the contents of particular regions of memory. Based on this information, the system may provide the user information and context about existence of anomalous conditions within the runtime state of the computing machine.

In some embodiments, the state information and/or query results (e.g., artifacts) derived from the runtime state information (e.g., memory information) may be stored within a database that can be indexed, distributed among users for collaborative analysis, or archived for future comparisons. In some embodiments, the data collected may be stored as "metadata", which may include a subset of original runtime state information but effectively describes a state of that computing machine. Metadata describing the state of the system often only requires a small fraction of the storage space as the runtime data itself. Once the data has been extracted, the system may provide a graphical user interface and/or scriptable interface to enable a user to formulate queries and perform other types of analysis. In some embodiments, the interface may allow a user to visualize, correlate, manually review, and/or annotate the results. It may also allow a user to search for particular artifacts across all "metadata" in an efficient manner.

Analyzing the amount of data stored in runtime state information in a meaningful and efficient way may also be desirable in some embodiments. To address this, the systems, devices, and methods described herein may provide a set of one or more views for visualizing and displaying the vast amount of data, including providing intuitive representations of relationships among various objects and artifacts found in memory. For example, the system may allow a user to graphically visualize and interactively explore temporal relationships between memory resident artifacts. In some embodiments, this may include an ability to filter based on temporal ranges or categories of artifacts, an ability to annotate, highlight, and bookmark artifacts, and/or an ability to swiftly pivot back to an original source of the data. The graphical user interface system may also provide views that emulate interactive navigation tools by reconstructing artifacts that are cached in memory. For example, the systems, methods, and/or devices described herein may provide graphical file system or Window's registry navigation tools based on data structures that are cached in memory. In some embodiments, the cached data may also be visually compared to other data that may have been collected from disk. The system may also provide a view that transparently presents the raw data across an address space (physical or virtual) and another view that allows a user to interactively disassemble and follow the code execution within memory. The system may also provide a view that allows the user to step through the execution of the code by emulating the processor using the memory resident data and register values. For example, states of registers and variables may be stored in memory. When a process context switch occurs, the state may stored so that the process can continue to execute when it is given a next slice of process time. Using state information, including but not limited to registers, stack, and memory allocations, execution of instructions may be emulated to determine what a particular function or a particular region of code does. This may be useful for analyzing decryption algorithms or other sets of instructions without fully performing reverse engineering.

In some embodiments, the analysis performed on the memory information may enable the visualization of artifacts associated with the memory information in several different ways. For example, the analysis may enable the artifacts to be grouped according to where they are found (e.g., kernel memory, etc.) or what they describe (e.g., user activity, network activity, etc.). In some embodiments, the visualization may include one or more tables that contain various rows of data. Some tables may also include sub-tables for logical separation of the artifacts. Furthermore, in some embodiments, the tables may enable a user to perform investigative actions against the datasets, such as producing a timeline.

In some embodiments, any combination of one or more of the following types of tables may be provided—process tables, services tables, user profile tables, strings table, network tables, registry tables, kernel tables, file system tables, timeline tables, and/or whitelist tables. In some embodiments, the systems, methods, and/or devices described herein may provide a mechanism for the user to switch between the various tables.

FIGS. 6A-6D are illustrations of an exemplary process table visualization in accordance with various embodiments of the systems, methods, and/or devices described herein. In some embodiments, the process tables may display processes in one of several different layouts (e.g., a table layout (FIG. 6A), a tree layout (FIG. 6B), a graph layout (FIG. 6C), and/or a cross-view layout (FIG. 6D)). In some embodiments, the table layout may be a typical table with rows and columns. For example, the columns may be used to provide relevant context about the process found in a particular row (e.g., command line, creation date and time, full path, etc). The tree layout may provide visualization of the processes in the memory information in a hierarchical structure to illustrate processes and their corresponding sub processes in a graphical manner. In the graph layout the processes may be represented as a node in a visualized graph or flow chart with connections illustrating parent and child relationships. The nodes may have a unique appearance (e.g., color) according to the status of the process (e.g., a processes marked as suspicious may be red). In some embodiments, the cross-view layout may help visualize processes hidden by rootkits. In some embodiments, the layout may include a table with multiple columns representing different algorithms for extracting artifacts. For example, InLists, InScan, InPspCid, InSession, InThreadScan, and/or InCsrss. The InList column may represent an algorithm that extracts processes found in a double linked active process list. The InScan column may represent an algorithm that indicates whether the process was found by pool tag scanning in physical memory. The InPspCid column may represent an algorithm that indicates whether the process was found in the kernel's PspCid handle table. The InSession column may represent an algorithm that indicates whether the process was found in the double linked list of session processes. The InThreadScan column may represent an algorithm that indicates whether the process was found by pool tag scanning for threads (and mapping the thread back to its owning process). The InCsrss column may represent an algorithm that indicates whether the process was found in the handle table of the csrss.exe process. In some embodiments, the cross-view (or cross-reference) layout may be a visualization technique that enables a user to quickly identify suspicious artifacts or malicious attempts to hide artifacts by manipulating memory resident data structures. The visualization may use a number of different algorithms and data sources that are used to represent the same data and highlight discrepancies.

Figure 7:
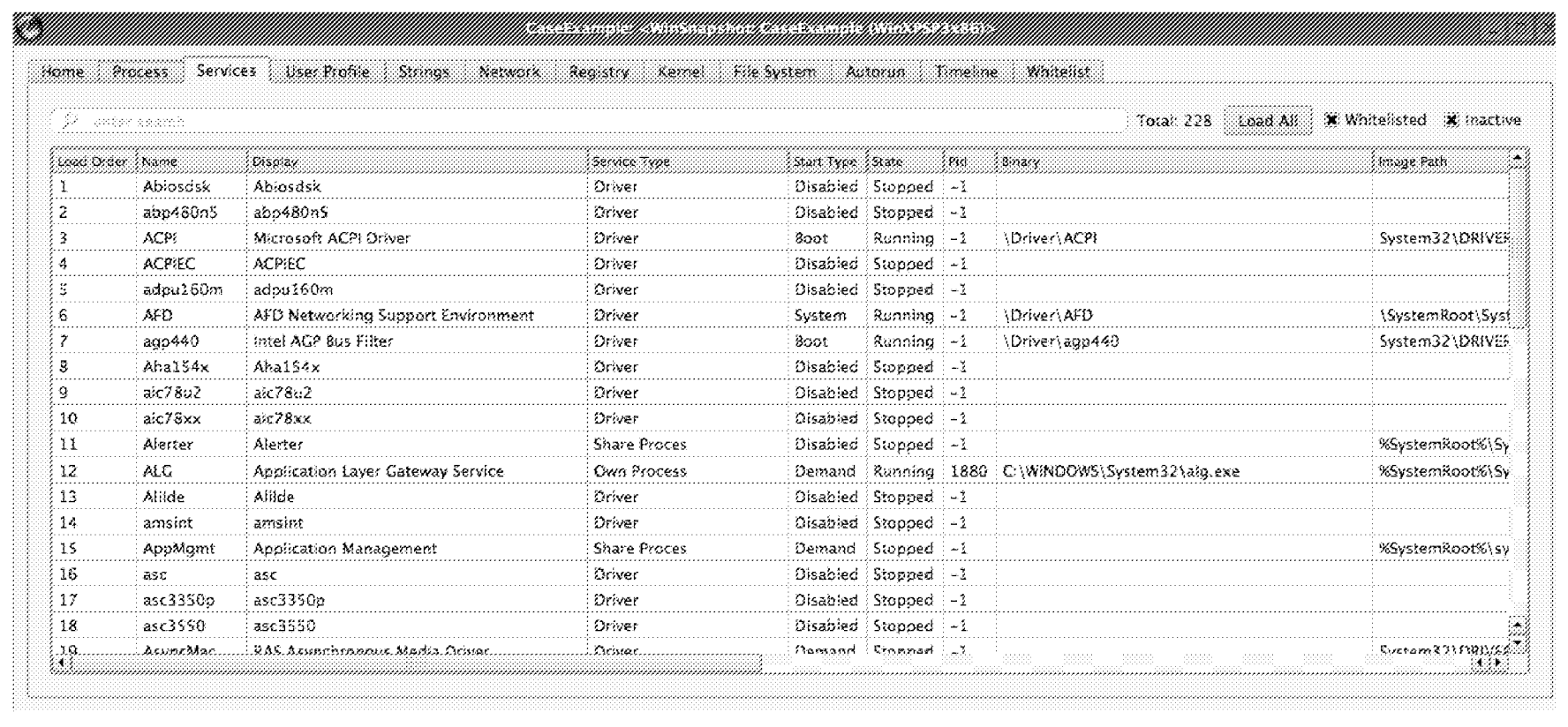

FIG. 7 is an illustration of an exemplary services table visualization in accordance with various embodiments of the systems, methods, and/or devices described herein. In some embodiments, the services tables may show details of installed services (e.g., services associated with a particular operation system of the target computing machine). For example, the table or tables may provide a visualization of the installed services in the order they were loaded (read) from the registry during the last startup. Accordingly, in some embodiments, any services installed after the last startup will appear at the end of the list. In some embodiments, the services table may include information related to the load order value, the service name, a description, a type, a start method, the current state, and associated binaries (e.g., processes, kernel modules, or service DLLs) from both memory and the registry. Since memory generally only contains the binary path if a service is running, by collecting from both sources (memory and registry), the systems, methods, and/or devices described herein may be able to link a binary to its service, regardless of its current state.

Figure 8:
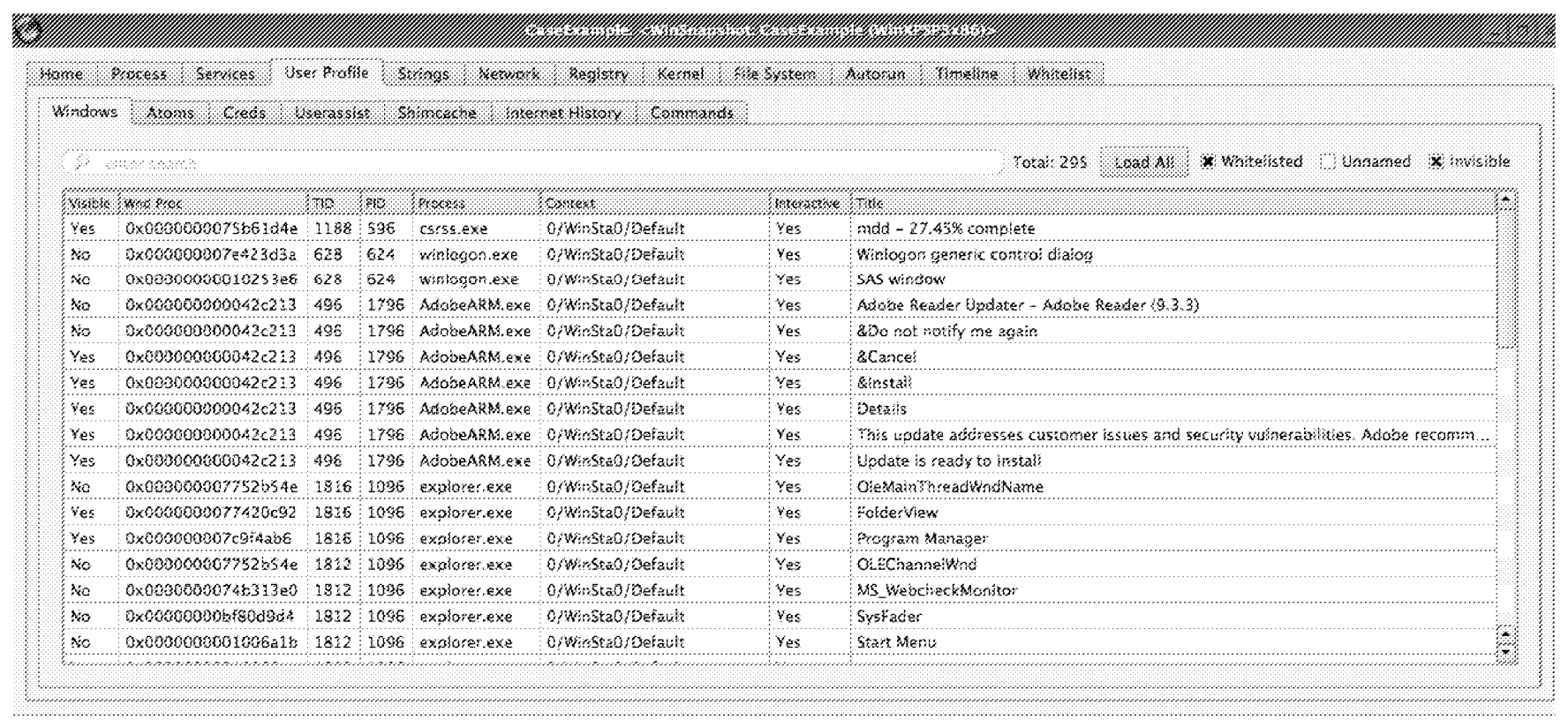

FIG. 8 is an illustration of an exemplary user profile table visualization in accordance with various embodiments of the systems, methods, and/or devices described herein. In some embodiments, the user profile tables may include/aggregate artifacts that help explain a suspect user's activity. The user profile tables may show window titles along with the owning process, thread, and/or context (e.g., session, windowstation, and desktop, etc.). The user profile tables may show atoms, which are frequently used by applications and malware to hide data. In some embodiments, the user profile tables may collect credentials such as default login passwords, cached domain hashes, password hashes, LAN Manager (LM) and Windows NT LAN Manager (NTLM) hashes, Local Security Authority (LSA) secrets, cached passwords for full disk encryption, and full disk encryption master keys, etc. In some embodiments, the user profile tables may include shimcache records from the registry (e.g., recently executed programs and their timestamps). The shimcache may be useful for a number of reasons. Shimcache data may be extracted from the registry. However, this approach may only recover programs executed before the last reboot of the computing machine. In other words, if the system is analyzing a memory dump from a computing machine that hasn't rebooted in 30 days, then the shimcache wouldn't normally show anything for the last month. However, systems, methods, and/or devices described herein may include a secondary method of recovering shimcache, which focuses on the in-memory cache of shimcache records (e.g., before it gets flushed to the registry). Thus, the systems, methods, and/or devices may provide analysis and visualization of entries from both perspectives. In some embodiments, the user profile tables may include information about recently executed programs from the user assist registry keys. The user profile tables may include information related to the suspect user's internet history (e.g., Internet Explorer cookies, visited URLs, etc.). In some embodiments, the internet history may include URLs and/or cookies accessed using e.g., the WinINet API (InternetOpenUrl, HttpSendRequest, etc) and may be based on scanning the memory of the process that load wininet.dll, including IE, Explorer, and even malware samples. In some embodiments, the system may be looking for cached index.dat records which are a well documented file format for IE history. In some embodiments, the user profile tables may recover commands entered into command prompts (e.g., cmd.exe, etc.), including Perl shells, Python shells, and/or PowerShells. In some embodiments, it may also include the responses to those commands.

Figure 9:
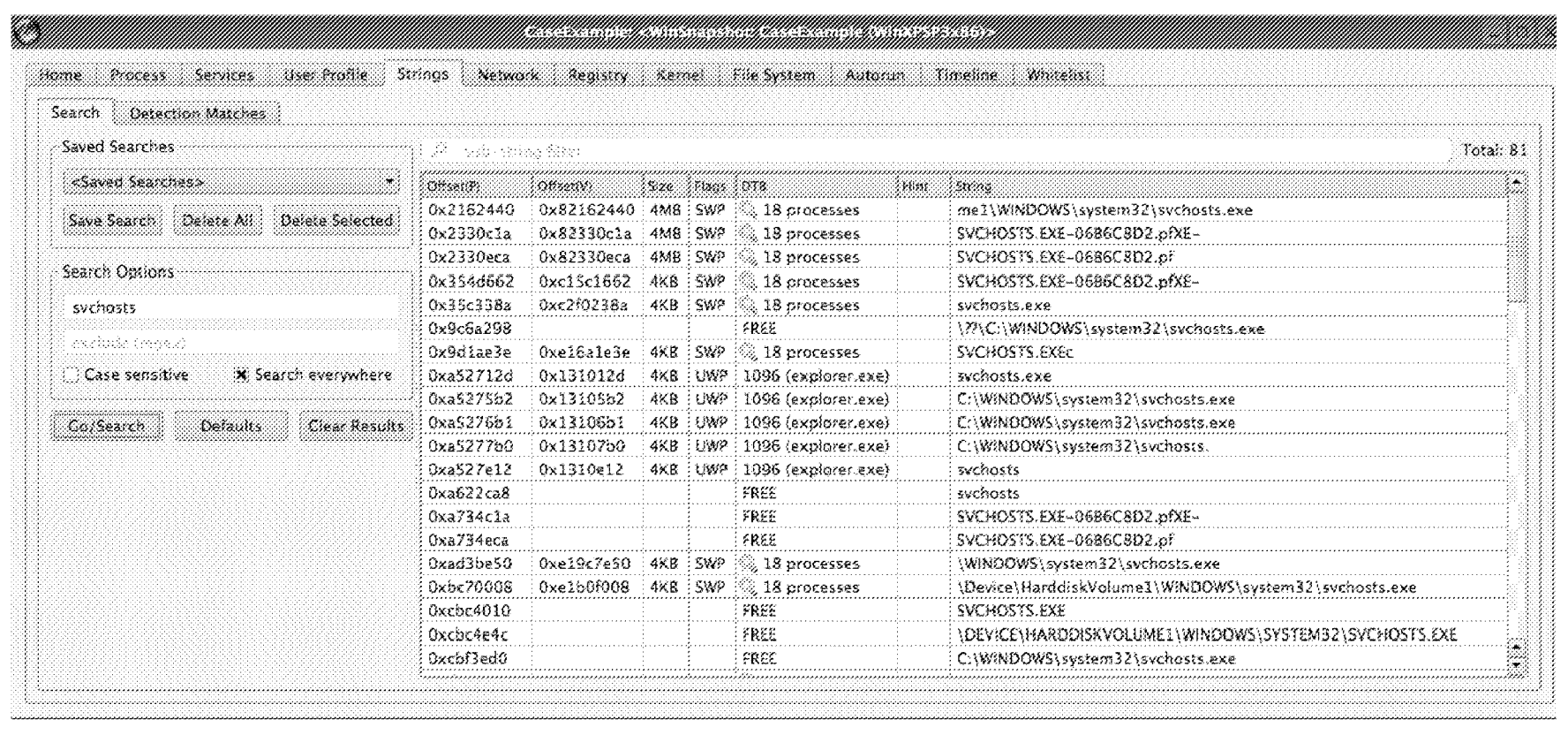

FIG. 9 is an illustration of an exemplary strings table visualization in accordance with various embodiments of the systems, methods, and/or devices described herein. In some embodiments, the strings table may enable a user to execute refined searches against extracted and translated strings data. This allows a user to rapidly find specific strings of interest to the investigation and filter out strings that may not be relevant. For example, a user may filter based on any combination of one or more of where the strings were found in memory, which processes could access those strings, the type of memory they were found in (heap, stack, libraries), and/or if they were found in kernel space or writeable memory. The visualization also provides a lot of context about the strings that can help user determine how the string was being used. In some embodiments, the system may allow a user to pivot from a string result and inspect other strings found in the same vicinity (e.g., in a hex editor) and/or may also allow creation of re-usable detections from an existing string so users can build future workflows based on artifacts they identify during current cases.

FIG. 10 is an illustration of an exemplary network table visualization in accordance with various embodiments of the systems, methods, and/or devices described herein. In some embodiments, the network tables may show network activity (and in some cases IP addresses, Domain Name Service (DNS) cache, Address Resolution Protocol (ARP) cache, etc.). Systems, methods and/or devices described herein may enable contextualization of network data in various ways. For example, the systems, methods, and/or devices may resolve the ports in use (e.g., local and remote ports) and/or describe the associated services in the UI. Also, in some embodiments, the systems, methods and/or device may be configured to map the network artifacts back to the processes that may have generated or accessed those artifacts. If there are too many entries with seemingly overwritten ports/addresses, the systems, methods, and/or devices described herein may enable the user to filter this information to hide entries that are no longer tied to a process, usually indicating they've been freed. The network tables may also benefit from employing geo-location process to identify the location of IP addresses; labeling/annotating networks/hosts; and/or DNS resolution.

Figure 11:
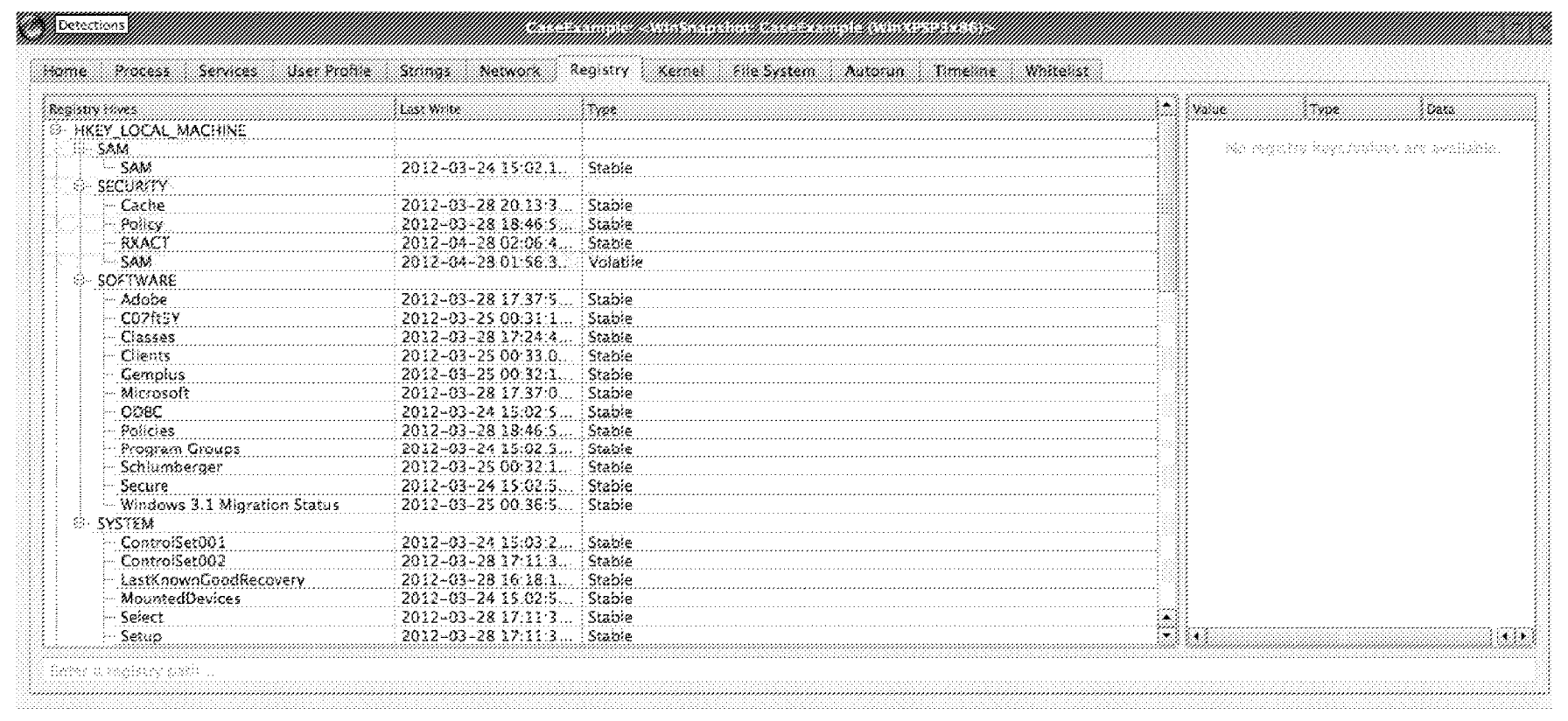

FIG. 11 is an illustration of an exemplary registry table visualization in accordance with various embodiments of the systems, methods, and/or devices described herein. In some embodiments, the registry tables may allow interactive browsing of cached registry hives. In some embodiments, this may include the ability to access volatile keys that are not written to the registry found on disk within the computing machine. The tables may expose information about the keys including the last time they were written to and the data stored within those keys. In some embodiments, this may require the memory dump file to be accessible to a command server process, since the data may be extracted in real time (i.e., not saved in the database).

Figure 12:
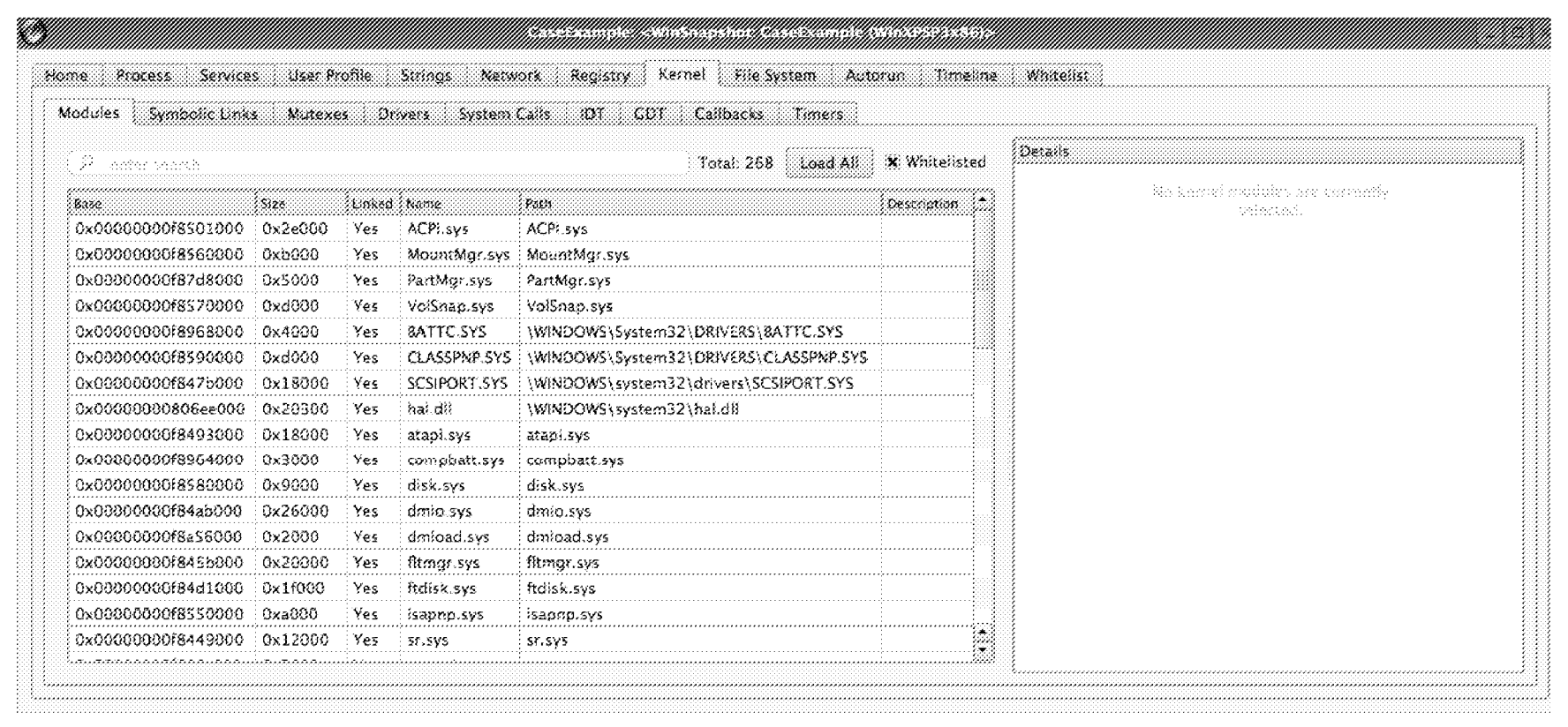

FIG. 12 is an illustration of an exemplary kernel table visualization in accordance with various embodiments of the systems, methods, and/or devices described herein. In some embodiments, the kernel tables may include various sub-tables for the deferent kernel memory artifacts (e.g., kernel modules, mutexes, symbolic links, driver objects, I/O request packets (IRPs), operating system callback functions, operating system timer routines, interrupt descriptor table (IDT)/global descriptor table (GDT), system service descriptor table (SSDT), etc.). These tables may provide context about the artifacts and allow a user to interactively drill down into how the artifacts may have been maliciously modified (e.g., disassemble address, scan regions of memory, extract strings, etc).

Figure 13:
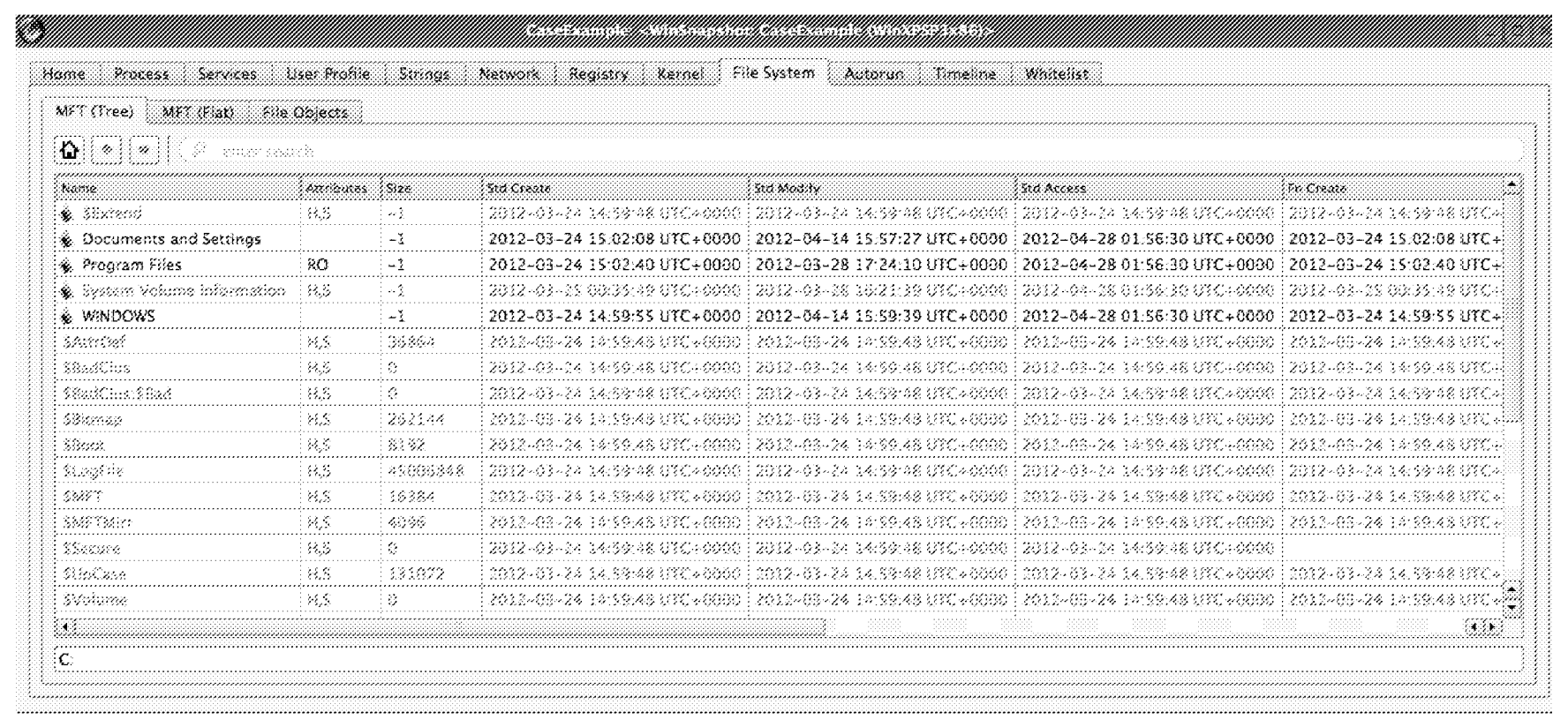

FIG. 13 is an illustration of an exemplary file system table visualization in accordance with various embodiments of the systems, methods, and/or devices described herein. In some embodiments, the file system tables may organize memory resident file system records allowing a user to navigate the file system interactively. In some embodiments, by using master file table (MFT) records and File Objects resources together, users may be able to perform relatively thorough disk forensics without having a copy of the disk. For example, users can determine if files/directories existed, when they were modified, and/or extract cached copies of file content. Systems, methods, and/or devices described herein may be capable of recovering MFT records from memory and reconstructing the relationships between files and directories. In exemplary embodiments, NWT records may contain multiple (e.g., 8) timestamps: 4 from Standard Information and 4 from File Name. The timestamp information may be useful in connection with the timeline tables discussed elsewhere herein.

Figure 14:
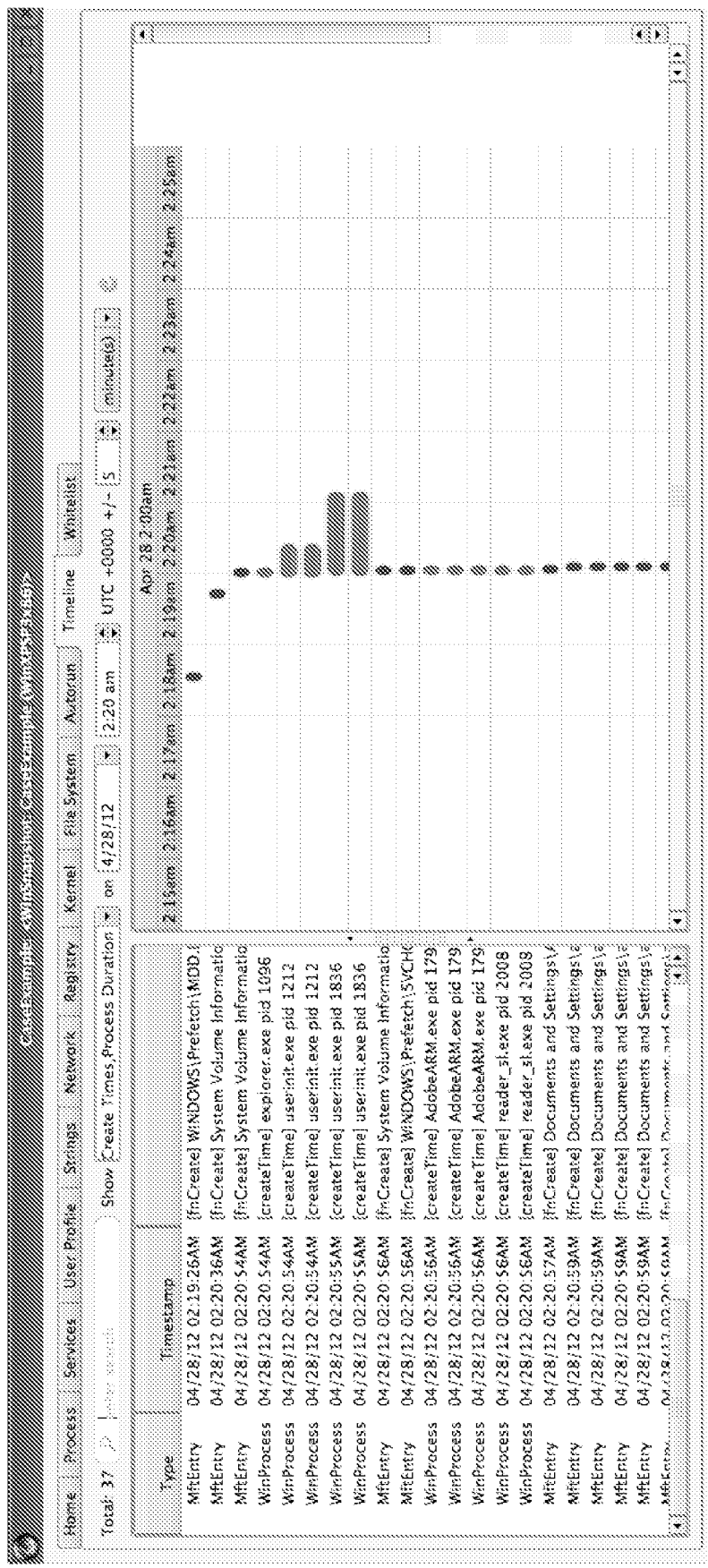
FIG. 14 is an illustration of an exemplary timeline table visualization in accordance with various embodiments of the systems, methods, and/or devices described herein.

FIG. 14 is an illustration of an exemplary timeline table visualization in accordance with various embodiments of the systems, methods, and/or devices described herein. In some embodiments, the timeline tables may enable a user to investigate temporal relationships between objects within the memory. In some embodiments, the timeline tables may be a canvas for visualizing temporal relationships between objects found in memory. For example, the left side of the canvas may contain details, such as the full time stamp, type of object, and the object's name. The right side of the canvas may contain a color-coded and/or time oriented list of symbols that correspond to the objects in the left. In some embodiments, a user may choose the artifacts to display and the time period to focus on. Investigators may calibrate the time period by selecting an artifact throughout the user interface that contains a time stamp and choosing the option to "open timeline."

Figure 15:
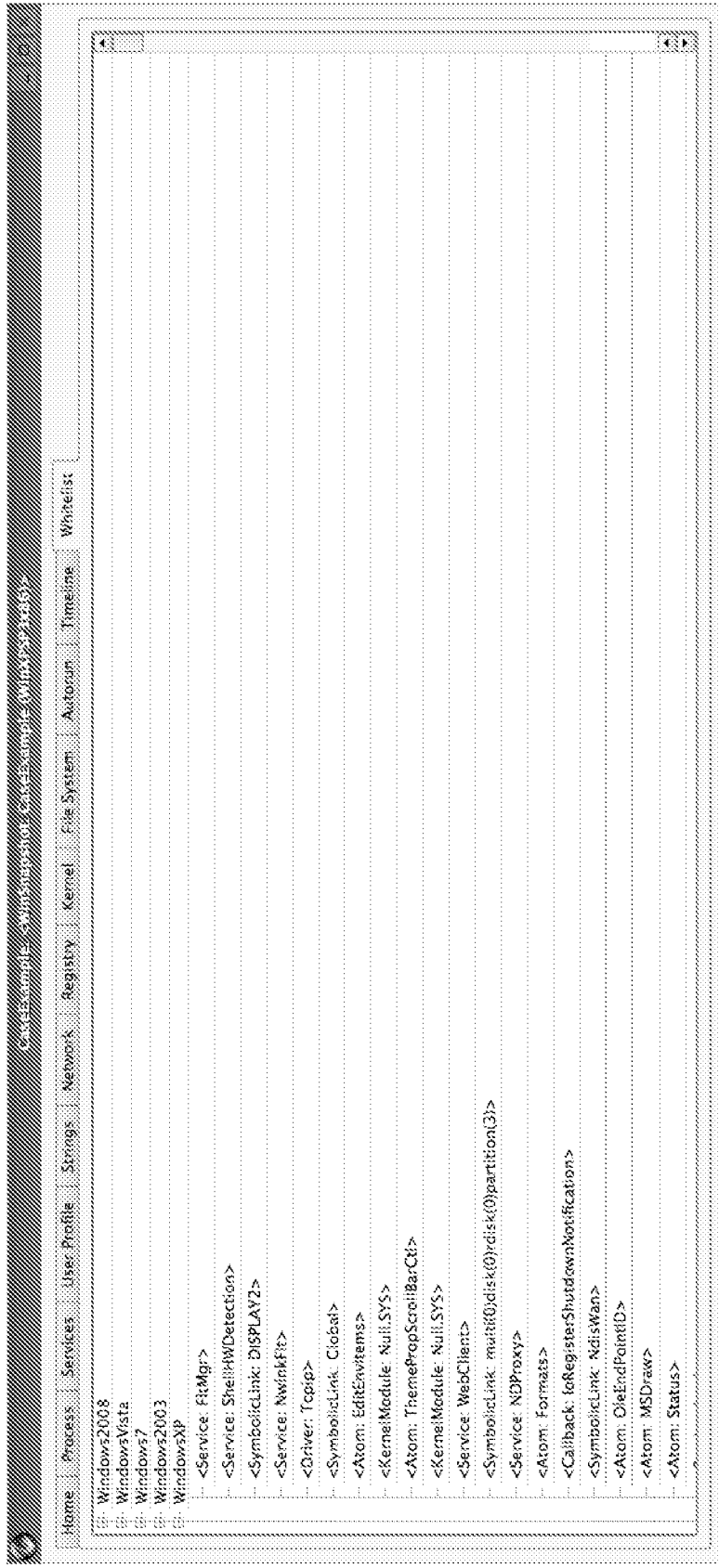
FIG. 15 is an illustration of an exemplary whitelist table visualization in accordance with various embodiments of the systems, methods, and/or devices described herein.

FIG. 15 is an illustration of an exemplary whitelist table visualization in accordance with various embodiments of the systems, methods, and/or devices described herein. In some embodiments, the whitelist tables may show a category-based breakdown of whitelisted objects. In some embodiments, the categories can relate to different versions of operating systems or applications. By expanding each category, it may be possible to determine which artifacts from the memory sample were whitelisted. It may also be possible to pivot directly to the portion of table where the extracted object is located.

In some embodiments, the systems, methods, and/or devices described herein may provide analysis algorithms that evaluate the runtime states of the computing machines for any combination of one or more of the following: (1) indications that the operating system's or application's data structures have not been modified, (2) differences from pre-existing or known good states, (3) indications of known attacker activity or malware, and/or (4) if compliance or organizational policies or configuration standards have been violated. In some embodiments, this may be accomplished by comparing the extracted artifacts to a model of how the runtime state information should appear for a known "good" operating system or application, how the system appeared at a previous point in time, against models of how typical attacks manifest themselves in memory resident artifacts, and/or against the policy and configuration standards that may be accepted for a particular situation. In some embodiments, the evaluation may be accomplished through a variety of extensible detection capabilities (e.g., scripts, database queries, byte sequence signatures, string matching, registry keys/values, whitelists, etc.) which may be utilized in conjunctions with the extracted data structures and artifacts. In some embodiments, the detection capabilities may be created, imported and/or exported to facilitate collaboration. In operation, if an abnormal condition or suspicious artifact is identified, it may be bookmarked and/or presented to a user for review, disposition, and/or comment. Users may also have the ability to manually bookmark and annotate artifacts they have found during manual inspection. In some embodiments, the systems, methods, and/or devices described herein may also provide mechanisms for managing and/or generating whitelists of known or trusted artifacts associated with operating systems and applications, which may help classify artifacts that are identified by detections.

As discussed, in some embodiments, the detections may help automate the identification of certain types of artifacts. In some embodiments, this type of detection may be beneficial if the user desires to perform a particular type of investigation. In some embodiments, the types of detections may include scripts, database queries, byte sequence signatures, string matching, registry keys/values, and/or whitelists.

The scripts may include e.g., python scripts that may query the data (e.g., the one or more databases). In some embodiments, the systems, methods, and/or devices described herein may enable a user to query the database and then perform a desired action (e.g., actions enabled by Python) with the data. For example, it may be possible to run DNS queries on IPs found in the memory dump or match objects with threat intelligence pulled from an internal SQL server or JSON web API.

The database queries may include queries built with the assistance of a graphical user interface that assist a user to match types of artifacts stored in the database. In some embodiments, the queries may be simple queries and/or compound queries.

The byte sequence signatures may include Yara signatures and rule files run in process and/or in kernel space.

String matching may include the ability to filter string results in free, process, and/or kernel memory. In some embodiments, string rules may let users execute searches against previously extracted and translated. This capability may enable users to carry out the tasks in an automated, repeatable manner. In some embodiments, the rule may have one or more sets of criteria, which contain a regex string to include and exclude. In some embodiments, it may also be possible/desirable to select what type of memory the string rule applies to. For example, the rule may look for artifacts in any combination of one or more of free memory, process memory, kernel memory, and/or free memory.

Registry keys/values rules may include the ability to find keys, values, data, types, etc. In some embodiments, hives may not be fully indexed during the initial data collection, so it may be desirable to access the original memory dump file in order to execute registry rules. In some embodiments, the rule may consist of one or more queries. For example, it may be able to identify malware that creates a run key in HKLM and a key for its configuration in HKCU.

The whitelist may be a type of query that causes suspicious matches to be whitelisted. In some embodiments, a whitelist may enable a user to define artifacts as components of an operating system or otherwise approved, and/or third party applications (such as anti-virus, MySQL, Flash). In some embodiments, certain artifacts may be whitelisted by default. In some embodiments, the whitelist may be user customizable. In some embodiments, the system may include multiple whitelists. In some embodiments the whitelist may be specified based on the operating system of the computing machine being analyzed. The whitelists may be used to annotate the data presented to the investigator to help classify extracted artifacts as to what is expected to be found on the target computing machine. In some embodiments, this may help provide visual indicators as to what artifacts are not normally found on the particular computing machine, thus reducing the time an investigator would spend investigating false positives.

Accordingly, rather than attempting to definitively determine if a system is experiencing abnormal conditions by looking for known signatures associated with malicious software artifacts within files found on disk or within the data exposed by the operating system's application program interface (APIs), the system leverages information extracted from the runtime state to provide the user information about abnormal conditions that were found within the runtime state and highlight those artifacts that are not normally found on the particular type of system or a system within their environment. The system verifies that the state of the system has not been maliciously or unintentionally modified.

In some embodiments, one of the unique challenges with performing runtime state analysis and including memory resident artifacts may be that the analysis and the methods used to detect abnormal conditions may be tied closely to particular versions of the operating system and the applications that are running on the computing machine. In addition, these operating systems and applications may be frequently updated to address security concerns or add new features. In contrast, traditional systems (e.g., anti-virus, etc.) that depend on analyzing files or parsing file systems formats rarely ever change. As a result, the systems, methods, and/or devices described herein may be designed to adapt (e.g., automatically adapt) as software is updated, as new applications are introduced, and/or as new operating systems are installed. In some embodiments, these new system changes may also generate indications of abnormal conditions that a user may want to designate as normal (e.g., add t a whitelist). In some embodiments, the system may leverage a modular software architecture that supports profiles (e.g., symbols, data structures, functions, parameters, local variables, etc.) and whitelists for new operating systems and hardware architectures. The systems, methods, and/or devices described herein may also be configured to automatically communicate with remote repositories to obtain updated profiles and/or whitelists.

In some embodiments, the systems, methods, and/or devices described herein may allow a user to graphically generate an analytics catalog that can be used to capture institutional knowledge and/or that can be easily shared with other users. For example, during analysis a user may be able to use the artifacts found in a memory sample as a template to develop a search pattern for an abnormal relationship between memory artifacts (e.g., process parent/child relationships, processes listening for network connections, etc.). In some embodiments, the search pattern may be composed of an arbitrary number of artifacts and logical or programmatic relationships among those artifacts. The search pattern may then be applied against the runtime state information collected from other systems, stored and used for future analysis, and/or shared more widely among other users. Similarly, the system may also allow a user to associate a response action with the analytics patterns.

In some embodiments, the systems, methods, and/or devices described herein may provide intuitive and/or efficient views into data representing the runtime state of a computing machine, and particularly data that has been extracted and is now being analyzed. By leveraging bookmarks and detections a user can quickly "drill down" through the data using a graphical user interface and/or a pointing device. Similarly, the user may be provided a centralized view of some or all of the detections and findings that provides a summary of analysis findings that can be managed and organized. Some of the views may also allow a user to move back and forth between different types of views, thus enabling a user to more quickly determine what was happening on the computing machine, find relationships between memory resident data objects, determine if a system remains in a trusted or compliant state, develop patterns for detecting abnormal conditions, and/or obtain insight into how the system is being used, among other things. This may also include an ability to graphically and automatically traverse "C" style pointers within memory resident data structures.

In some embodiments, the systems, methods, and/or devices described herein may also be configured to decouple the visualization system from the extraction and analysis system. In some embodiments, this may provide a remote analysis capability where the processing can be pushed to an end system, run on a remote server with more computing resources, and/or distributed across servers in a cloud environment. The visualization system can then access the results remotely without requiring the original runtime state information to be stored on the same system. Another advantage of this configuration is that it also facilitates batch processing of large amounts of runtime state information.

While examples have been used to disclose the invention and to enable any person of ordinary skilled in the art to make and use the invention, the patentable scope of the invention is defined by claims, and may include other examples that occur to those skilled in the art. For instance, the systems and processes described herein may be web-based and operate via a web browser, or may be client based. The database may be implemented as files, object-oriented databases, SQL databases, or any other suitable database architecture. Accordingly, the examples disclosed herein are to be considered non-limiting.

As another example of the wide scope of the systems, methods, and/or devices described herein, the systems, methods, and/or devices may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or appropriately designed hardware, including but not limited to application specific integrated circuits (ASIC) and field programmable gate arrays (FPGA) configured to carry out the systems, methods, and/or devices described herein.

It is further noted that the systems, methods, and/or devices disclosed herein may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The data (e.g., associations, mappings, etc.) described herein may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems, methods, and/or devices described herein may be provided on many different types of non-transient computer-readable storage media including computer storage mechanisms (e.g., CD-ROM or other optical storage medium, magnetic diskette, RAM, flash memory, a hard drive, etc.) that contain instructions (e.g., software) for use in execution by a processor to perform the methods' operations and implement the systems and/or devices described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents that fall within the range of the claims are intended to be embraced therein.

What is claimed is:

1. A method for aiding cyber intrusion investigations, the method comprising:
    extracting data from a specified range of a volatile memory of a target processing device;
    reconstructing data structures and artifacts from the extracted data; and
    generating and presenting a visualization of the reconstructed data structures and the reconstructed artifacts, in the form of at least one of a table layout, a tree layout, a graph layout, and/or a cross-view layout, to assess the condition of the target processing device; and
    providing a plurality of analysis methods for evaluating a state of the target processing device, the plurality of analysis methods performing at least one of determining differences from a known good state, detecting indications of known attacker activity, detecting indications of malware being present, detecting heuristics associated with suspicious activity, detecting discrepancies in logical relationships among the reconstructed artifacts, and determining whether policies or standards have been violated;
    wherein the method is performed by at least one processing device.

2. The method of claim 1, wherein the plurality of analysis methods include one or more of scripts, database queries, byte sequence signatures, string matching, and comparison of registry key values.

3. The method of claim 1, further comprising:
    presenting indications of suspicious activity or indications of abnormal conditions to a user; and
    providing a facility for the user to bookmark and annotate artifacts.

4. The method of claim 1, further comprising:
    providing a user an ability to develop custom workflows.

5. The method of claim 1, further comprising:
    correlating information within the volatile memory with data stored in at least one other data source to determine an existence of at least one inconsistencies or anomalies.

6. The method of claim 1, further comprising:
    extracting, indexing, and/or correlating information regarding a state of the target processing device over at least one particular point in time; and
    providing a facility for archiving and tracking changes in the state of the target processing device over time.

7. The method of claim 1, further comprising:
    providing a facility to generate a sharable analytics catalog.

8. The method of claim 1, further comprising:
    providing a graphical user interface and a scriptable interface for formulating queries and performing other types of analysis.

9. The method of claim 1, further comprising:
    generating, managing, and/or sharing detection methods for detecting anomalous conditions using artifacts displayed with the graphical user interface.

10. The method of claim 9, further comprising:
    importing at least one other detection method for detecting the anomalous conditions using the artifacts displayed with the graphical user interface.

11. The method of claim 9, further comprising:
    collecting metrics regarding effectiveness of the detection algorithms; and
    sending the collected metrics to at least one other processing device for remote analytics.

12. The method of claim 1, further comprising:
    automatically evaluating capabilities of memory resident executables and associated file formats by analyzing imported libraries and exported methods for inconsistencies or anomalies.

13. The method of claim 1, further comprising:
    providing a facility to associate a response action with at least one analytic pattern.

14. The method of claim 13, wherein the response actions include at least one of querying new types of data, generating an alert, and/or halting a process.

15. The method of claim 1, further comprising:
    importing or generating whitelists of normal, known, or trusted, conditions;
    sharing the whitelists; and
    managing the whitelists.

16. The method of claim 1, further comprising:
    extracting metadata based on the extracted data;
    storing the metadata, the metadata describing a system state and including a subset of original runtime state information.

17. The method of claim 1, further comprising:
    reconstructing data stores based on data found in cached memory of the processing device.

18. A method for aiding cyber intrusion investigations, the method comprising:
    communicating with at least one remote processing device via a secure web services application program interface,
    providing a graphical user interface for formulating queries and displaying artifacts related to anomalous conditions, providing storage for whitelists and detected anomalies, the whitelists comprising information related to normal known, or trusted, conditions, requesting and receiving information regarding artifacts and data structures found in a memory sample, and generating and presenting a visualization of the data structures and the artifacts, in the form of at least one of a table layout, a tree layout, a graph layout and/or a cross-view layout, to assess the condition of the target processing device.

* * * * *